(12) United States Patent
Stallings et al.

(10) Patent No.: US 8,028,313 B2
(45) Date of Patent: Sep. 27, 2011

(54) LINEAR PROGRAM GUIDE FOR MEDIA CONTENT ACCESS SYSTEMS AND METHODS

(75) Inventors: Heath Stallings, Grapevine, TX (US); Brian Roberts, Frisco, TX (US); Don Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 573 days.

(21) Appl. No.: 11/614,604

(22) Filed: Dec. 21, 2006

(65) Prior Publication Data

US 2008/0155595 A1   Jun. 26, 2008

(51) Int. Cl.
 G06F 13/00 (2006.01)
 G06F 3/00 (2006.01)
 H04N 5/445 (2006.01)
(52) U.S. Cl. .................. 725/39; 725/44; 725/45; 725/52
(58) Field of Classification Search .............. 725/37–61; 715/719, 784, 785, 819
 See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,473,362 A | 12/1995 | Fitzgerald et al. |
| 5,479,266 A | 12/1995 | Young et al. |
| 5,479,268 A | 12/1995 | Young et al. |
| 5,499,103 A | 3/1996 | Mankovitz |
| 5,510,811 A | 4/1996 | Tobey et al. |
| 5,512,963 A | 4/1996 | Mankovitz |
| 5,515,173 A | 5/1996 | Mankovitz et al. |
| 5,517,257 A | 5/1996 | Dunn et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,585,838 A | 12/1996 | Lawler et al. |
| 5,600,368 A | 2/1997 | Matthews |
| 5,600,711 A | 2/1997 | Yuen |
| 5,616,876 A | 4/1997 | Cluts |
| 5,619,274 A | 4/1997 | Roop et al. |
| 5,623,613 A | 4/1997 | Rowe et al. |

(Continued)

OTHER PUBLICATIONS

User,s Manual for the Examiner Automated Search Tool (EAST)2.1 by Computer Science Corporation, May 5, 2006.*

(Continued)

*Primary Examiner* — Christopher Kelley
*Assistant Examiner* — Mulugeta Mengesha

(57) ABSTRACT

In one of many possible embodiments, a system includes a media content processing subsystem configured to provide at least a portion of a linear program guide to a display for presentation to a user. The linear program guide includes a list of media content carriers and associated media content instances, and an endpoint located at one end of the list. The media content carriers and the endpoint are navigable by the user, and the endpoint is associated with at least one selectable navigation tool for navigating within the linear program guide. In certain embodiments, the selectable navigation tool includes a selectable shortcut to a predefined location within the linear program guide.

23 Claims, 13 Drawing Sheets

U.S. PATENT DOCUMENTS

| | | | |
|---|---|---|---|
| 5,630,119 A | 5/1997 | Aristides et al. | |
| 5,640,484 A | 6/1997 | Mankovitz | |
| 5,648,824 A | 7/1997 | Dunn et al. | |
| 5,654,748 A | 8/1997 | Matthews | |
| 5,657,072 A | 8/1997 | Aristides et al. | |
| 5,673,401 A | 9/1997 | Volk et al. | |
| 5,677,708 A | 10/1997 | Matthews et al. | |
| 5,678,012 A | 10/1997 | Kimmich et al. | |
| 5,682,511 A | 10/1997 | Sposato et al. | |
| 5,684,525 A | 11/1997 | Klosterman | |
| 5,687,331 A | 11/1997 | Volk et al. | |
| 5,689,663 A | 11/1997 | Williams | |
| 5,694,176 A * | 12/1997 | Bruette et al. | 725/43 |
| 5,699,107 A | 12/1997 | Lawler et al. | |
| 5,701,383 A | 12/1997 | Russo et al. | |
| 5,706,145 A | 1/1998 | Hindman et al. | |
| 5,721,829 A | 2/1998 | Dunn et al. | |
| 5,724,492 A | 3/1998 | Matthews et al. | |
| 5,727,060 A | 3/1998 | Young | |
| 5,731,844 A | 3/1998 | Rauch et al. | |
| 5,734,786 A | 3/1998 | Mankovitz | |
| 5,745,095 A | 4/1998 | Parchem et al. | |
| 5,745,713 A | 4/1998 | Ferguson et al. | |
| 5,751,282 A | 5/1998 | Girard et al. | |
| 5,752,160 A | 5/1998 | Dunn | |
| 5,758,258 A | 5/1998 | Shoff et al. | |
| 5,758,259 A | 5/1998 | Lawler | |
| 5,774,172 A | 6/1998 | Kapell et al. | |
| 5,781,228 A | 7/1998 | Sposato | |
| 5,790,115 A | 8/1998 | Pleyer et al. | |
| 5,790,198 A | 8/1998 | Roop et al. | |
| 5,793,973 A | 8/1998 | Birdwell et al. | |
| 5,801,787 A | 9/1998 | Schein et al. | |
| 5,805,165 A | 9/1998 | Thorne et al. | |
| 5,805,763 A | 9/1998 | Lawler et al. | |
| 5,808,608 A | 9/1998 | Young et al. | |
| 5,809,204 A | 9/1998 | Young et al. | |
| 5,812,123 A | 9/1998 | Rowe et al. | |
| 5,812,205 A | 9/1998 | Milnes et al. | |
| 5,815,145 A | 9/1998 | Matthews | |
| 5,815,195 A | 9/1998 | Tam | |
| 5,828,945 A | 10/1998 | Klosterman | |
| 5,857,190 A | 1/1999 | Brown | |
| 5,861,906 A | 1/1999 | Dunn et al. | |
| 5,870,150 A | 2/1999 | Yuen | |
| 5,874,985 A | 2/1999 | Matthews | |
| 5,878,141 A | 3/1999 | Daly et al. | |
| 5,883,627 A | 3/1999 | Pleyer | |
| 5,886,746 A | 3/1999 | Yuen et al. | |
| 5,900,905 A | 5/1999 | Shoff et al. | |
| 5,905,522 A | 5/1999 | Lawler | |
| 5,907,323 A | 5/1999 | Lawler et al. | |
| 5,914,746 A | 6/1999 | Matthews et al. | |
| 5,915,026 A | 6/1999 | Mankovitz | |
| 5,923,362 A | 7/1999 | Klosterman | |
| 5,940,073 A | 8/1999 | Klosterman et al. | |
| 5,940,074 A | 8/1999 | Britt et al. | |
| 5,945,987 A | 8/1999 | Dunn | |
| 5,945,991 A | 8/1999 | Britt et al. | |
| 5,949,954 A | 9/1999 | Young et al. | |
| 5,959,688 A | 9/1999 | Schein et al. | |
| 5,969,748 A | 10/1999 | Casement et al. | |
| 5,970,206 A | 10/1999 | Yuen et al. | |
| 5,974,222 A | 10/1999 | Yuen et al. | |
| 5,987,213 A | 11/1999 | Mankovitz et al. | |
| 5,987,509 A | 11/1999 | Portuesi | |
| 5,988,078 A | 11/1999 | Levine | |
| 5,990,883 A | 11/1999 | Byrne et al. | |
| 5,991,498 A | 11/1999 | Young | |
| 6,002,394 A | 12/1999 | Schein et al. | |
| 6,002,852 A | 12/1999 | Birdwell et al. | |
| 6,005,563 A | 12/1999 | White et al. | |
| 6,008,803 A | 12/1999 | Rowe et al. | |
| 6,008,836 A | 12/1999 | Bruck et al. | |
| 6,014,706 A | 1/2000 | Cannon et al. | |
| 6,016,141 A | 1/2000 | Knudson et al. | |
| 6,025,837 A | 2/2000 | Matthews et al. | |
| 6,028,599 A | 2/2000 | Yuen et al. | |
| 6,028,604 A | 2/2000 | Matthews et al. | |
| 6,034,689 A | 3/2000 | White et al. | |
| 6,049,652 A | 4/2000 | Yuen et al. | |
| 6,052,145 A | 4/2000 | Macrae et al. | |
| 6,055,314 A | 4/2000 | Spies et al. | |
| 6,072,485 A | 6/2000 | Barnes et al. | |
| 6,072,983 A | 6/2000 | Klosterman | |
| 6,075,551 A | 6/2000 | Berezowski et al. | |
| 6,075,575 A | 6/2000 | Schein et al. | |
| 6,078,348 A | 6/2000 | Klosterman et al. | |
| 6,091,882 A | 7/2000 | Yuen et al. | |
| 6,098,086 A | 8/2000 | Krueger et al. | |
| 6,118,492 A | 9/2000 | Milnes et al. | |
| 6,130,726 A * | 10/2000 | Darbee et al. | 348/734 |
| 6,133,909 A | 10/2000 | Schein et al. | |
| 6,133,913 A | 10/2000 | White et al. | |
| 6,137,950 A | 10/2000 | Yuen | |
| 6,141,003 A | 10/2000 | Chor et al. | |
| 6,141,678 A | 10/2000 | Britt | |
| 6,144,378 A | 11/2000 | Lee | |
| 6,144,401 A | 11/2000 | Casement et al. | |
| 6,144,964 A | 11/2000 | Breese et al. | |
| 6,151,059 A | 11/2000 | Schein et al. | |
| 6,154,205 A | 11/2000 | Carroll et al. | |
| 6,167,188 A | 12/2000 | Young et al. | |
| 6,173,317 B1 | 1/2001 | Chaddha et al. | |
| 6,177,931 B1 | 1/2001 | Alexander et al. | |
| 6,177,945 B1 | 1/2001 | Pleyer | |
| 6,182,072 B1 | 1/2001 | Leak et al. | |
| 6,188,401 B1 | 2/2001 | Peyer | |
| 6,215,483 B1 | 4/2001 | Zigmond | |
| 6,216,265 B1 | 4/2001 | Roop et al. | |
| 6,230,319 B1 | 5/2001 | Britt et al. | |
| 6,237,022 B1 | 5/2001 | Bruck et al. | |
| 6,239,794 B1 | 5/2001 | Yuen et al. | |
| 6,240,555 B1 | 5/2001 | Shoff et al. | |
| 6,247,176 B1 | 6/2001 | Schein et al. | |
| 6,259,442 B1 | 7/2001 | Britt et al. | |
| 6,262,722 B1 | 7/2001 | Allison et al. | |
| 6,263,501 B1 | 7/2001 | Schein et al. | |
| 6,266,059 B1 | 7/2001 | Matthews et al. | |
| 6,268,856 B1 | 7/2001 | Bruck et al. | |
| 6,292,834 B1 | 9/2001 | Ravi et al. | |
| 6,300,967 B1 * | 10/2001 | Wagner et al. | 715/784 |
| 6,304,969 B1 | 10/2001 | Wasserman et al. | |
| 6,308,202 B1 | 10/2001 | Cohn et al. | |
| 6,311,197 B2 | 10/2001 | Mighdoll et al. | |
| 6,311,207 B1 | 10/2001 | Mighdoll et al. | |
| 6,313,851 B1 | 11/2001 | Matthews et al. | |
| 6,317,780 B1 | 11/2001 | Cohn et al. | |
| 6,317,791 B1 | 11/2001 | Cohn et al. | |
| 6,317,885 B1 | 11/2001 | Fries | |
| 6,323,911 B1 | 11/2001 | Schein et al. | |
| 6,330,719 B1 | 12/2001 | Zigmond et al. | |
| 6,340,997 B1 | 1/2002 | Borseth | |
| 6,341,195 B1 | 1/2002 | Mankovitz et al. | |
| 6,341,374 B2 | 1/2002 | Schein et al. | |
| 6,344,865 B1 | 2/2002 | Matthews et al. | |
| 6,345,264 B1 | 2/2002 | Breese et al. | |
| 6,347,398 B1 | 2/2002 | Parthasarathy et al. | |
| 6,353,813 B1 | 3/2002 | Breese et al. | |
| 6,378,035 B1 | 4/2002 | Parry et al. | |
| 6,388,714 B1 | 5/2002 | Schein et al. | |
| 6,392,664 B1 | 5/2002 | White et al. | |
| 6,396,473 B1 | 5/2002 | Callahan et al. | |
| 6,396,546 B1 | 5/2002 | Alten et al. | |
| 6,400,407 B1 | 6/2002 | Zigmond et al. | |
| 6,412,110 B1 | 6/2002 | Schein et al. | |
| 6,412,112 B1 | 6/2002 | Barrett et al. | |
| 6,424,342 B1 | 7/2002 | Perlman et al. | |
| 6,425,125 B1 | 7/2002 | Fries et al. | |
| 6,430,358 B1 | 8/2002 | Yuen et al. | |
| 6,430,359 B1 | 8/2002 | Yuen et al. | |
| 6,449,766 B1 | 9/2002 | Fleming | |
| 6,453,471 B1 | 9/2002 | Klosterman | |
| 6,460,180 B1 | 10/2002 | Park et al. | |
| 6,460,181 B1 | 10/2002 | Donnelly | |
| 6,463,486 B1 | 10/2002 | Parry et al. | |
| 6,466,734 B2 | 10/2002 | Yuen et al. | |

| Patent | Kind | Date | Inventor |
|---|---|---|---|
| 6,469,721 | B2 | 10/2002 | Matthews et al. |
| 6,469,753 | B1 | 10/2002 | Klosterman et al. |
| 6,477,705 | B1 | 11/2002 | Yuen et al. |
| 6,496,205 | B1 | 12/2002 | White et al. |
| 6,498,895 | B2 | 12/2002 | Young et al. |
| 6,499,057 | B1 | 12/2002 | Portuesi |
| 6,505,232 | B1 | 1/2003 | Mighdoll et al. |
| 6,505,348 | B1 | 1/2003 | Knowles et al. |
| 6,519,771 | B1 | 2/2003 | Zenith |
| 6,535,920 | B1 | 3/2003 | Parry et al. |
| 6,538,701 | B1 | 3/2003 | Yuen |
| 6,539,375 | B2 | 3/2003 | Kawasaki |
| 6,549,719 | B2 | 4/2003 | Mankovitz |
| 6,560,777 | B2 | 5/2003 | Blackketter et al. |
| 6,564,379 | B1 | 5/2003 | Knudson et al. |
| 6,567,606 | B2 | 5/2003 | Milnes et al. |
| 6,570,581 | B1 | 5/2003 | Smith |
| 6,571,390 | B1 | 5/2003 | Dunn et al. |
| 6,571,392 | B1 | 5/2003 | Zigmond et al. |
| 6,577,346 | B1 | 6/2003 | Perlman |
| 6,588,013 | B1 | 7/2003 | Lumley et al. |
| 6,606,652 | B1 | 8/2003 | Cohn et al. |
| 6,628,301 | B1 | 9/2003 | Acton et al. |
| 6,628,302 | B2 | 9/2003 | White et al. |
| 6,631,523 | B1 | 10/2003 | Matthews et al. |
| 6,637,031 | B1 | 10/2003 | Chou |
| 6,637,032 | B1 | 10/2003 | Feinleib |
| 6,651,251 | B1 | 11/2003 | Shoff et al. |
| RE038,376 | E | 12/2003 | Matthews, III |
| 6,662,218 | B2 | 12/2003 | Mighdoll et al. |
| 6,668,133 | B2 | 12/2003 | Yuen et al. |
| 6,668,377 | B1 | 12/2003 | Dunn |
| 6,678,737 | B1 | 1/2004 | Bucher |
| 6,683,630 | B1 | 1/2004 | Shoff et al. |
| 6,684,025 | B1 | 1/2004 | Perlman |
| 6,687,906 | B1 | 2/2004 | Yuen et al. |
| 6,694,352 | B1 | 2/2004 | Omoigui |
| 6,698,020 | B1 | 2/2004 | Zigmond et al. |
| 6,704,058 | B2 | 3/2004 | Ranta |
| 6,704,773 | B1 | 3/2004 | Cohn et al. |
| 6,704,776 | B1 | 3/2004 | Fortune |
| 6,704,813 | B2 | 3/2004 | Smirnov et al. |
| 6,704,929 | B1 | 3/2004 | Ozer et al. |
| 6,708,335 | B1 | 3/2004 | Ozer et al. |
| 6,724,405 | B2 | 4/2004 | Matthews et al. |
| 6,732,369 | B1 | 5/2004 | Schien et al. |
| 6,742,043 | B1 | 5/2004 | Moussa et al. |
| 6,742,183 | B1 | 5/2004 | Reynolds et al. |
| 6,745,391 | B1 | 6/2004 | Macrae et al. |
| 6,748,375 | B1 | 6/2004 | Wong et al. |
| 6,748,481 | B1 | 6/2004 | Parry et al. |
| 6,754,715 | B1 | 6/2004 | Cannon et al. |
| 6,756,997 | B1 | 6/2004 | Ward et al. |
| 6,760,537 | B2 | 7/2004 | Mankovitz |
| 6,766,523 | B2 | 7/2004 | Herley |
| 6,766,524 | B1 | 7/2004 | Matheny et al. |
| 6,772,438 | B2 | 8/2004 | Blackketter et al. |
| 6,785,901 | B1 | 8/2004 | Horiwitz et al. |
| 6,785,902 | B1 | 8/2004 | Zigmond et al. |
| 6,798,971 | B2 | 9/2004 | Potrebic |
| 6,799,326 | B2 | 9/2004 | Boylan et al. |
| 6,799,327 | B1 | 9/2004 | Reynolds et al. |
| 6,804,824 | B1 | 10/2004 | Potrebic et al. |
| 6,804,825 | B1 | 10/2004 | White et al. |
| 6,819,344 | B2 | 11/2004 | Robbins |
| 6,820,144 | B2 | 11/2004 | Smirnov et al. |
| 6,829,779 | B1 | 12/2004 | Perlman |
| 6,847,779 | B2 | 1/2005 | Pietraszak |
| 6,850,693 | B2 | 2/2005 | Young et al. |
| 6,859,799 | B1 | 2/2005 | Yuen |
| 6,859,937 | B1 | 2/2005 | Narayan et al. |
| 6,868,551 | B1 | 3/2005 | Lawler et al. |
| 6,886,179 | B1 | 4/2005 | Perlman |
| 6,891,553 | B1 | 5/2005 | White et al. |
| 6,892,390 | B1 | 5/2005 | Lieberman et al. |
| 6,897,904 | B2 | 5/2005 | Potrebic et al. |
| 6,898,765 | B2 | 5/2005 | Matthews et al. |
| 6,901,453 | B1 | 5/2005 | Pritchett et al. |
| 6,903,753 | B1 | 6/2005 | Gray et al. |
| 6,904,609 | B1 | 6/2005 | Pietraszak et al. |
| 6,906,755 | B1 | 6/2005 | Lundblad et al. |
| 6,907,576 | B2 | 6/2005 | Barbanson et al. |
| 6,928,652 | B1 | 8/2005 | Goldman |
| 6,928,655 | B1 | 8/2005 | Omoigui |
| 6,931,657 | B1 | 8/2005 | Marsh |
| 6,938,077 | B2 | 8/2005 | Sanders |
| 6,938,270 | B2 | 8/2005 | Blackketter et al. |
| 6,947,935 | B1 | 9/2005 | Horvitz et al. |
| 6,957,260 | B1 | 10/2005 | Mighdoll et al. |
| 6,963,903 | B2 | 11/2005 | Krueger et al. |
| 6,963,906 | B2 | 11/2005 | Portuesi |
| 6,965,415 | B2 | 11/2005 | Lundblad et al. |
| 6,966,066 | B1 | 11/2005 | Zigmond et al. |
| 6,968,364 | B1 | 11/2005 | Wong et al. |
| 6,970,640 | B2 | 11/2005 | Green et al. |
| 6,973,050 | B2 | 12/2005 | Birdwell et al. |
| 6,973,664 | B2 | 12/2005 | Fries |
| 6,973,669 | B2 | 12/2005 | Daniels |
| 6,980,993 | B2 | 12/2005 | Horvitz et al. |
| 6,981,227 | B1 | 12/2005 | Taylor |
| 6,986,062 | B2 | 1/2006 | Carpenter |
| 6,990,462 | B1 | 1/2006 | Wilcox et al. |
| 6,990,497 | B2 | 1/2006 | O'Rourke et al. |
| 6,990,671 | B1 | 1/2006 | Evans et al. |
| 6,990,677 | B1 | 1/2006 | Pietraszak et al. |
| 6,990,678 | B2 | 1/2006 | Zigmond |
| 6,993,532 | B1 | 1/2006 | Platt et al. |
| 6,996,390 | B2 | 2/2006 | Herley et al. |
| 7,007,244 | B2 | 2/2006 | Pankovcin |
| D516,573 | S | 3/2006 | Gibson |
| D517,087 | S | 3/2006 | Sands |
| 7,010,265 | B2 | 3/2006 | Coffin |
| 7,013,238 | B1 | 3/2006 | Weare |
| 7,015,925 | B2 | 3/2006 | Ford et al. |
| D518,487 | S | 4/2006 | MacKenzie et al. |
| D519,122 | S | 4/2006 | MacKenzie et al. |
| D519,519 | S | 4/2006 | Vong |
| D519,521 | S | 4/2006 | Fong |
| 7,023,492 | B2 | 4/2006 | Sullivan |
| 7,024,424 | B1 | 4/2006 | Platt et al. |
| 7,026,964 | B2 | 4/2006 | Baldwin et al. |
| 7,027,101 | B1 | 4/2006 | Sloo et al. |
| 7,028,325 | B1 | 4/2006 | Rui et al. |
| 7,030,886 | B2 | 4/2006 | Ford et al. |
| 7,034,776 | B1 | 4/2006 | Love |
| 7,035,526 | B2 | 4/2006 | Green |
| 7,036,083 | B1 | 4/2006 | Zenith |
| 7,036,092 | B2 | 4/2006 | Sloo et al. |
| 7,038,690 | B2 | 5/2006 | Wilt et al. |
| 7,039,935 | B2 | 5/2006 | Knudson et al. |
| 7,042,526 | B1 | 5/2006 | Borseth |
| 7,043,477 | B2 | 5/2006 | Mercer et al. |
| 7,050,097 | B2 | 5/2006 | Schick et al. |
| 7,050,867 | B2 | 5/2006 | Maymudes |
| 7,051,282 | B2 | 5/2006 | Marcjan |
| 7,051,351 | B2 | 5/2006 | Goldman et al. |
| 7,058,720 | B1 | 6/2006 | Majidimehr |
| 7,058,936 | B2 | 6/2006 | Chilimbi et al. |
| 7,065,553 | B1 | 6/2006 | Chesley et al. |
| 7,069,576 | B1 | 6/2006 | Knudson et al. |
| 7,073,193 | B2 | 7/2006 | Marsh |
| 7,076,734 | B2 | 7/2006 | Wolff et al. |
| 7,076,792 | B2 | 7/2006 | Zigmond et al. |
| 7,076,794 | B2 | 7/2006 | Lieberman et al. |
| 7,088,910 | B2 | 8/2006 | Potrebic et al. |
| 7,093,273 | B2 | 8/2006 | Marsh |
| 7,098,868 | B2 | 8/2006 | Love et al. |
| 7,099,952 | B2 | 8/2006 | Wong et al. |
| 7,103,904 | B1 | 9/2006 | Blackketter et al. |
| 7,107,608 | B2 | 9/2006 | Wagner et al. |
| 7,117,439 | B2 | 10/2006 | Barrett et al. |
| 7,127,127 | B2 | 10/2006 | Jojic et al. |
| 7,130,846 | B2 | 10/2006 | Danker et al. |
| 7,487,529 | B1 | 2/2009 | Orlick |
| 2001/0029610 | A1 | 10/2001 | Corvin et al. |
| 2001/0047298 | A1 | 11/2001 | Moore et al. |
| 2001/0054181 | A1 | 12/2001 | Corvin |
| 2002/0049971 | A1* | 4/2002 | Augenbraun et al. .......... 725/39 |

| | | |
|---|---|---|
| 2002/0073424 A1 | 6/2002 | Ward et al. |
| 2002/0124255 A1 | 9/2002 | Reichardt et al. |
| 2002/0194599 A1* | 12/2002 | Mountain ............... 725/39 |
| 2003/0005445 A1 | 1/2003 | Schein et al. |
| 2003/0056219 A1 | 3/2003 | Reichardt et al. |
| 2003/0110495 A1 | 6/2003 | Bennington et al. |
| 2003/0110499 A1 | 6/2003 | Knudson et al. |
| 2003/0115599 A1 | 6/2003 | Bennington et al. |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0204847 A1 | 10/2003 | Ellis et al. |
| 2003/0208756 A1 | 11/2003 | Macrae et al. |
| 2004/0010806 A1 | 1/2004 | Yuen et al. |
| 2004/0045025 A1 | 3/2004 | Ward et al. |
| 2004/0107437 A1 | 6/2004 | Reichardt et al. |
| 2004/0168189 A1 | 8/2004 | Reynolds et al. |
| 2004/0194138 A1 | 9/2004 | Boylan et al. |
| 2004/0261098 A1 | 12/2004 | Macrae et al. |
| 2005/0010949 A1 | 1/2005 | Ward et al. |
| 2005/0028201 A1 | 2/2005 | Klosterman et al. |
| 2005/0125823 A1 | 6/2005 | McCoy et al. |
| 2005/0149964 A1 | 7/2005 | Thomas et al. |
| 2005/0155056 A1 | 7/2005 | Knee et al. |
| 2005/0216936 A1 | 9/2005 | Knudson et al. |
| 2005/0251824 A1 | 11/2005 | Thomas et al. |
| 2005/0278768 A1* | 12/2005 | Boyer et al. ............... 725/113 |
| 2006/0015903 A1* | 1/2006 | MacBeth et al. ............ 725/46 |
| 2006/0059516 A1* | 3/2006 | Montvay et al. ............ 725/46 |
| 2006/0156336 A1 | 7/2006 | Knudson et al. |
| 2006/0158570 A1* | 7/2006 | Arora et al. ............... 348/731 |
| 2006/0212894 A1 | 9/2006 | Knudson et al. |
| 2006/0277574 A1 | 12/2006 | Schein et al. |
| 2006/0288366 A1 | 12/2006 | Boylan et al. |
| 2007/0016926 A1 | 1/2007 | Ward et al. |
| 2007/0033613 A1 | 2/2007 | Ward et al. |
| 2007/0079330 A1* | 4/2007 | Ludvig et al. ............... 725/38 |
| 2007/0107010 A1 | 5/2007 | Jolna et al. |

OTHER PUBLICATIONS

User's Manual for the Examiner Automated Search Tool (EAST)2.1 by Computer Science Corporation, May 5, 2006.*

* cited by examiner

150

| Beginning of Linear Program Guide 151 | Media Content Carrier 152-1 | Media Content Carrier 152-2 | ... | Media Content Carrier 152-N | End of Linear Program Guide 153 |

Fig. 5

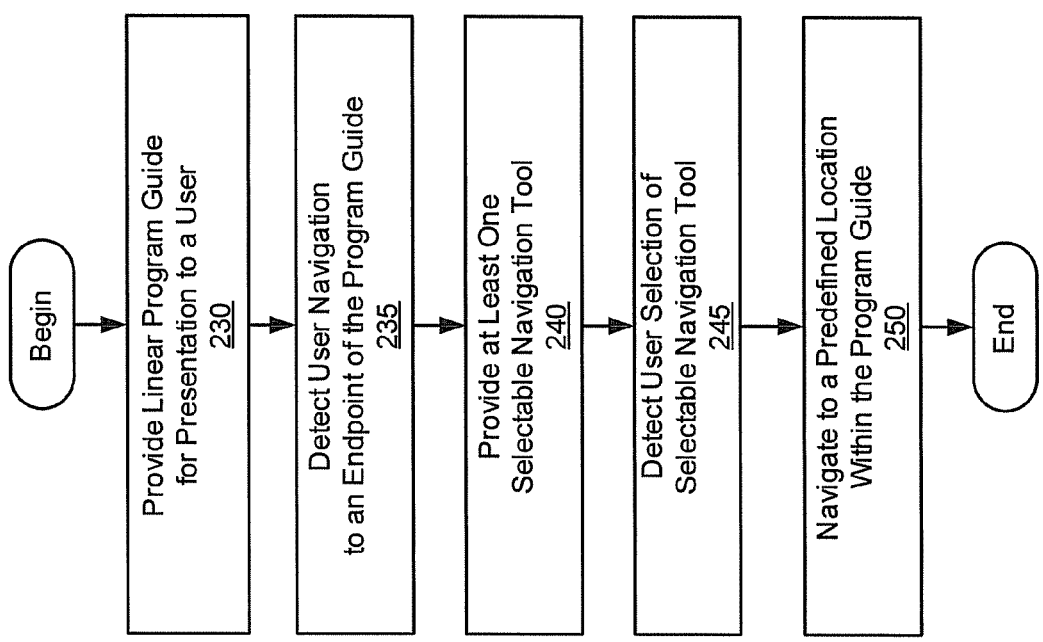

LINEAR PROGRAM GUIDE FOR MEDIA CONTENT ACCESS SYSTEMS AND METHODS

BACKGROUND INFORMATION

The advent of computers, interactive electronic communication, the Internet, and other advances in the digital realm of consumer electronics have resulted in a great variety of enhanced programming, recording, and viewing options for users who view media content such as television programs. In implementing such enhanced options, the set-top box ("STB") has become an important computing device for accessing media content services and the media content within those services. In addition to supporting traditional analog broadcast video functionality, STBs also support an increasing number of two-way digital services such as video-on-demand, internet protocol television ("IPTV"), and personal video recording.

An STB is typically connected to a cable or satellite, or generally, a subscriber television system, and includes hardware and software necessary to provide enhanced options for a subscriber television system at a subscriber location. Conventional STBs include a processor, communication components, and memory and are connected to a television or other display device, such as a personal computer. While many STBs are stand-alone devices that are externally connected to a television, an STB and/or its functionality may be integrated into a television or personal computer, a mobile device such as a mobile phone or a personal digital assistant ("PDA"), or even into an audio device such as a programmable radio.

An STB is usually configured to provide users with a large number and variety of media content choices. For example, a user may choose to view a variety of broadcast television programs, pay-per-view services, video-on-demand programming, Internet services, and audio programming via an STB.

The large number of media content choices often makes it difficult for an STB user to find and select desired media content for viewing. On-screen program guides have alleviated this confusion to some degree. However, the use of a conventional on-screen program guide is limiting in many instances. For example, conventional on-screen program guides are typically circular so that when a user scrolls beyond the highest-numbered media channel in a particular program guide, the guide automatically wraps around to the lowest-numbered media channel in the guide. This may be rather limiting to some users who desire enhanced navigation options. Moreover, a user casually scrolling through a circular program guide may not notice the automatic "wrap-around" occurring, which may lead to confusion and/or redundant scrolling.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

FIG. 5 illustrates an exemplary program guide structure, according to an embodiment.

FIG. 13 illustrates an exemplary method of providing a linear program guide and at least one selectable navigation tool for navigating within the linear program guide, according to an embodiment.

DETAILED DESCRIPTION OF PREFERRED EMBODIMENTS

I. Introduction

Exemplary systems and methods for providing a linear program guide are disclosed. In certain embodiments, a media content processing subsystem (e.g., a set-top box) may be configured to provide a linear program guide, or a portion of a linear program guide, to a display for presentation to a user. The linear program guide may include a list of content carriers (e.g., media channels) and associated media content instances. As user herein, the term "content carriers" will be used to refer generally to any carrier of media content, including, but not limited to, media (e.g., television) channels, streams, addresses, frequencies or other carriers of media content. As user herein, the term "media content instance" will be used to refer generally to any television program, on demand program, pay-per-view program, broadcast media program, IPTV, commercial, advertisement, video, movie, song, image, photograph, sound, or any segment, component, or combination of these or other forms of media content that may be viewed or otherwise experienced by a user.

The linear program guide may also include an endpoint located at an end of the list of content carriers. In certain embodiments, the list includes two navigable endpoints, one at each end of the list of content carriers.

The content carriers and the endpoint(s) included in the linear program guide may be navigable by a user. In certain embodiments, for example, the user is able to utilize a user input device to navigate through the program guide, including navigating to any of the content carriers and endpoints included in the program guide. When a user navigates to an endpoint, the media content processing subsystem may provide at least one selectable navigation tool, which may enable the user to navigate within the program guide. In certain embodiments, a navigation tool includes a selectable shortcut to a predefined location within the program guide. The predefined location may be a particular content carrier, endpoint, or group of content carriers.

Accordingly, when the user navigates to an endpoint of a linear program guide (e.g., the user scrolls to the end of the program guide), the media content processing subsystem may provide the user with one or more navigation tools that enable her to quickly and conveniently navigate within the program guide. In some examples, the user is provided with multiple navigation tools associated with different locations within the program guide such that the user has multiple navigation options. The navigation tools may be included in a navigation palette configured to be displayed as an overlay to at least a portion of the program guide.

Components and functions of exemplary embodiments of a linear program guide for media content access systems and methods will now be described in more detail.

II. Exemplary System View

Figure 1:
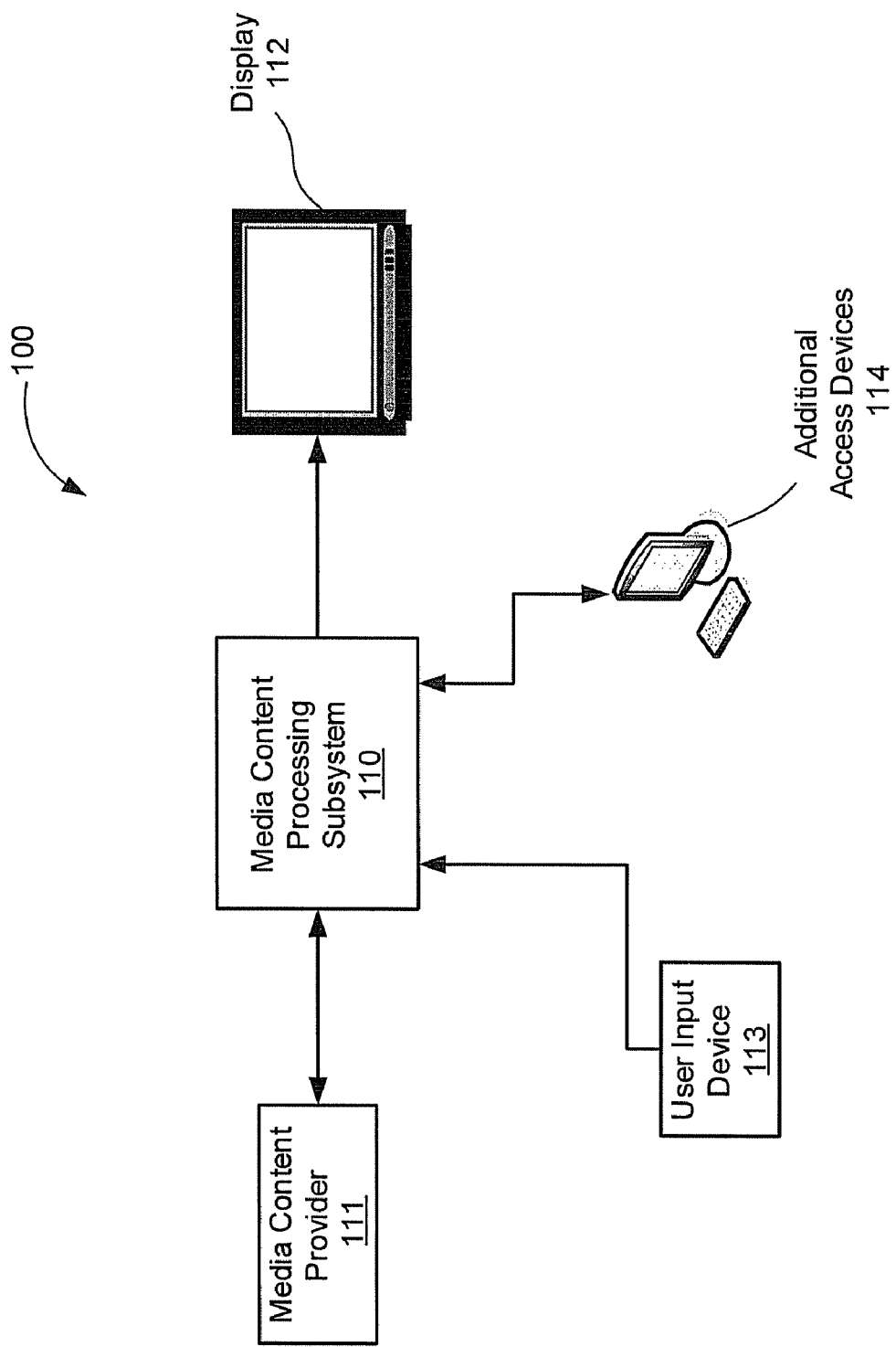
FIG. 1 illustrates an example of a media content access system, according to an embodiment.

FIG. 1 illustrates an example of a media content access system 100, according to one exemplary embodiment. Media content access system 100 may take many different forms and include multiple and/or alternate components and facilities.

As shown in FIG. 1, a media content processing subsystem 110 may be configured to communicate with and receive a signal or data stream (e.g., a media content stream) containing media content from a media content provider 111. The media content processing subsystem 110 and media content provider 111 may communicate using any known communication technologies, devices, media, and protocols supportive of remote data communications, including, but not limited to, cable networks, subscriber television networks, satellite networks, the Internet, intranets, local area networks, wireless networks (e.g., mobile telephone networks), optical fiber networks, data transmission media, communications devices, Transmission Control Protocol ("TCP"), Internet Protocol ("IP"), File Transfer Protocol ("FTP"), Telnet, Hypertext Transfer Protocol ("HTTP"), socket connections, Ethernet, and other suitable communications networks and technologies.

The media content processing subsystem 110 may use any suitable technology or technologies to receive media content from the media content provider 111, including using a tuner to receive a media content instance, as described below. The media content processing subsystem 110 may be configured to process the media content stream provided by the media content provider 111, including causing a media content instance, or one or more components (e.g., video and/or audio components) of a media content instance, to be presented for experiencing (e.g., viewing) by a user. The presentation of the media content instance may include, but is not limited to, displaying, playing back, or otherwise processing the media content instance, or one or more components of the media content instance, such that it may be experienced by the user. For example, the media content processing subsystem 110 may provide a signal to a display 112 (e.g., a television, computer monitor, etc.) so that the display 112 may present (e.g., display) media content for experiencing by the user.

As shown in FIG. 1, and as will be described in more detail below, the media content processing subsystem 110 may be controlled by a user input device 113 (e.g., a remote control device) and/or one or more additional access devices 114 (e.g., a personal computer, wireless device, mobile phone, etc.).

While an exemplary media content access system 100 is shown in FIG. 1, the exemplary components illustrated in FIG. 1 are not intended to be limiting. Indeed, additional or alternative components and/or implementations may be used, as is well known. Each of the components of system 100 will now be described in additional detail.

A. Media Content Provider

Media content provider 111 is configured to provide various types of media content via a satellite, cable system, subscriber television network, the Internet, optical fiber network, wireless network, or any other suitable network. The media content may include, but is not limited to audio-visual content (e.g., broadcast television programs, pay-per-view services, Internet Protocol Television ("IPTV"), Digital Video Disc ("DVD") related content, or video-on-demand programming), pre-recorded media content, data communication services such as Internet services, images, and audio programming.

Figure 2:
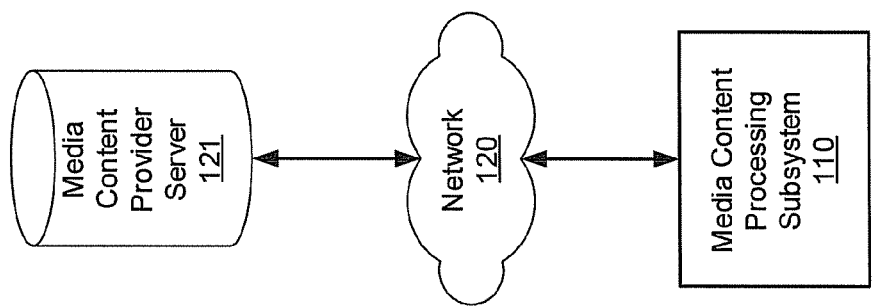
FIG. 2 is an illustration of an exemplary media content provider network, according to an embodiment.

An exemplary media content provider 111 includes a media content provider server 121, as shown in FIG. 2. The media content provider server 121 may be configured to communicate with the media content processing subsystem 110 via one or more types of networks 120 (and communications links thereto). The network 120 shown in FIG. 2 may include, but is not limited to, the Internet, an intranet or other private packet-switched network, a wireless network (e.g., a wireless phone network or a Wi-Fi network), a cable television network (e.g., a hybrid fiber-coax network), a wireless broadcast network (e.g., a satellite media broadcasting network or terrestrial broadcasting network), a subscriber television network, a telephone network, a provider-specific network (e.g., a Verizon® FIOS® network), an optical fiber network, any other suitable network, and any combination of these networks. In some alternative examples, the processing subsystem 110 may be connected directly to the media content provider server 121.

B. Display

As mentioned, the processing subsystem 110 may be coupled to a display 112 configured to present content, including media content, to a user. The display 112 may display, play, or otherwise present the content for experiencing by the user. The display 112 may include, but is not limited to, a television, computer monitor, mobile phone, handheld device, display screen, or any other device configured to present content to a user.

C. Media Content Processing Subsystem

Figure 3:
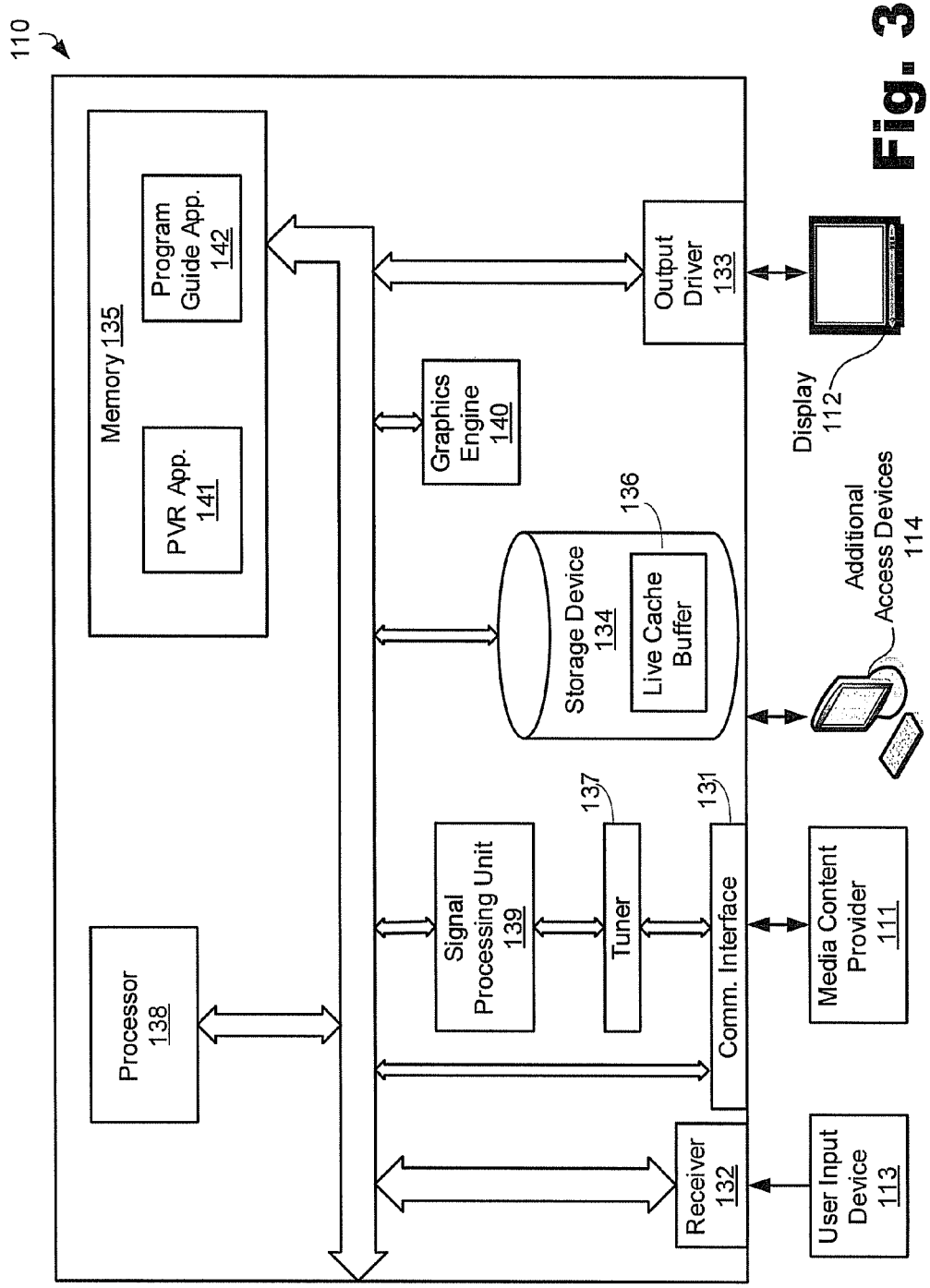
FIG. 3 is a block diagram of an exemplary media content processing subsystem, according to an embodiment.

FIG. 3 is a block diagram of an exemplary media content processing subsystem 110 (or simply "processing subsystem 110") according to an exemplary embodiment. The processing subsystem 110 may include any combination of hardware, software, and firmware configured to process an incoming media content stream. As used herein and in the appended claims, unless otherwise specifically denoted, the terms "media content processing subsystem" and "processing subsystem" will be used to refer expansively to all possible receivers that receive and process digital and/or analog media content. Hence, an exemplary processing subsystem 110 may include, but is not limited to, a set-top box ("STB"), home communication terminal ("HCT"), digital home communication terminal ("DHCT"), stand-alone personal video recorder ("PVR"), DVD player, video-enabled phone, and personal computer.

In certain embodiments, the processing subsystem 110 may include any computer hardware and/or instructions (e.g., software programs), or combinations of software and hardware, configured to perform the processes described herein. In particular, it should be understood that processing subsystem 110 may be implemented on one physical computing device or may be implemented on more than one physical computing device. Accordingly, processing subsystem 110 may include any one of a number of well known computing devices, and may employ any of a number of well known computer operating systems, including, but by no means limited to, known versions and/or varieties of the Microsoft Windows® operating system, the UNIX operating system, Macintosh® operating system, and the Linux® operating system.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary processing subsystem 110 is shown in FIG. 3, the exemplary components illustrated in FIG. 3 are not intended to be limiting. Indeed, additional or alternative components and/or implementations may be used. Various components of the processing subsystem 110 will now be described in additional detail.

1. Communication Interfaces

As shown in FIG. 3, the processing subsystem 110 may include a communication interface 131 configured to receive content (e.g., media content) in any format from the media content provider 111 or from any other suitable media content source. The communication interface 131 may include any device, logic, and/or other technologies suitable for receiving signals and/or data representative of media content and/or other types of content or data. The communication interface 131 may be configured to interface with any suitable communication media, protocols, and formats, including any of those mentioned above.

In certain embodiments, the communication interface 131 may include a single port configured to receive media content from the media content provider 111 and/or from any other source (e.g., from another processing subsystem, another server, etc.) For example, the communication interface 131 may include or be connected to a broadband connection, which can enable the processing subsystem 110 to receive media content on a single port from multiple sources. In other embodiments, multiple ports may be used.

The processing subsystem 110 may also include a receiver 132 configured to receive input commands from a user input device 113. The user input device 113 may include, for example, a remote control device, keyboard, or any other suitable input device and may be configured to communicate with the receiver 132 via a wireless link, electrical connection, or any other suitable communication link.

Figure 4:
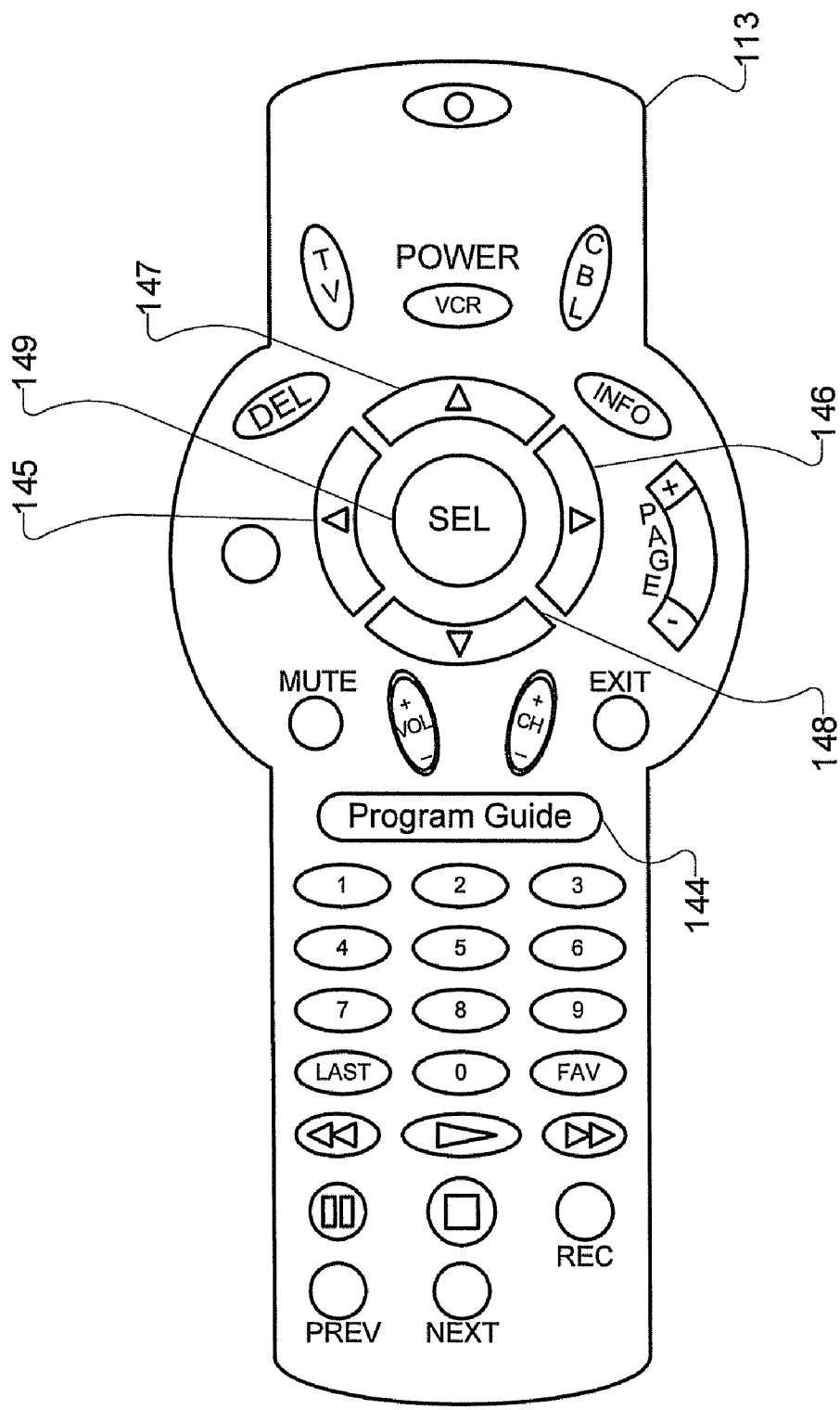
FIG. 4 illustrates an exemplary remote control user input device, according to an embodiment.

An exemplary remote control user input device 113 is illustrated in FIG. 4. In some examples, the input device 113 may be configured to enable a user to control viewing options of the media content. A program guide button 144, as will be described in more detail below, may be configured to evoke the display of a program guide on the display 112. A left button 145, right button 146, up button 147, down button 148, and select button 149 may be included and configured to enable the user to evoke and/or navigate through various views and graphical user interfaces displayed by the display 112. It will be recognized that the input device 113 shown in FIG. 4 is merely illustrative of the many different types of user input devices that may be used in connection with the present systems and methods.

Returning to FIG. 3, one or more additional access devices 114 may also be configured to communicate with the processing subsystem 110. These access devices 114 may include, but are not limited to, personal computers and mobile devices (e.g., laptops, PDAs, cellular phones, etc.). In some examples, as will be described in more detail below, the access devices 114 may be configured to access content stored and/or processed by the processing subsystem 110. For example, media content that has been recorded by the processing subsystem 110 may be accessed and viewed on a personal computer. Moreover, the additional access devices 114 may be used to program or otherwise control the functions of the processing subsystem 110.

The processing subsystem 110 may also include an output driver 133 configured to interface with or drive the display 112. As instructed by one or more processors of the processing subsystem 110, the output driver 133 may provide output signals to the display 112, the output signals including content (e.g., media content) to be presented by the display 112 for experiencing by a user. The output driver 133 may include any combination of hardware, software, and firmware as may serve a particular application.

2. Storage Devices

Storage device 134 may include one or more data storage media, devices, or configurations and may employ any type, form, and combination of storage media. For example, the storage device 134 may include, but is not limited to, a hard drive, network drive, flash drive, magnetic disc, optical disc, or other non-volatile storage unit. As will be described in more detail below, various portions of media content, program guide data, and other data may be temporarily and/or permanently stored in the storage device 134.

The storage device 134 of FIG. 3 is shown to be a part of the processing subsystem 110 for illustrative purposes only. It will be understood that the storage device 134 may additionally or alternatively be located external to the processing subsystem 110.

The processing subsystem may also include memory 135. Memory 135 may include, but is not limited to, FLASH memory, random access memory ("RAM"), dynamic RAM ("DRAM"), or a combination thereof. In some examples, as will be described in more detail below, various applications (e.g., a program guide application) used by the processing subsystem 110 may reside in memory 135.

As shown in FIG. 3, the storage device 134 may include one or more live cache buffers 136. The live cache buffer 136 may additionally or alternatively reside in memory 135 or in a storage device external to the processing subsystem 110. In some examples, media content data may be temporarily stored in the live cache buffer 136 to facilitate viewing of the media content in one or more trick play modes.

3. Tuner

Tuner 137 may be configured to tune to a particular content carrier (e.g., media channel, stream, address, frequency or other carrier) in order to process media content that is transmitted on that carrier. In some examples, the tuner 137 may include multiple tuners such that multiple carriers of media content may be processed and/or shown on a display 112. For example, the tuner 137 may include a first tuner configured to receive an analog video signal corresponding to a first media content instance and a second tuner configured to simultaneously receive a digital compressed stream corresponding to a second media content instance. It will be recognized that the tuner 137 may have any number of tuners configured to receive any kind of media content.

In some examples, media content received at the tuner 137 is temporarily buffered, or stored, in the live cache buffer 136. If there are multiple tuners 137, there may be a live cache buffer 136 corresponding to each of the tuners 137. Once media content is temporarily stored in the live cache buffer 136, the user may then designate whether the media content is to be permanently stored as a permanent recording in the storage device 134 or whether the media content is to be deleted. As used herein, the term "permanent recording" will be understood to mean media content that is stored for an extended period of time as decided by the user.

While tuner 137 may be used to receive various types of media-content-carrying signals broadcast by media content provider 111, processing subsystem 110 may be configured to receive other types of content signals (including media content signals) from the media content provider 111 without using a tuner. For example, media content provider 111 may broadcast digital streams of data packets (e.g., Internet Protocol ("IP") based data packets) that can be received without using a tuner. For such types of content signals, the communication interface 131 may receive and forward the signals directly to other components of the processing subsystem 110 (e.g., the signal processing unit 139) without going through the tuner 137. For an IP-based signal, for example, the signal processing unit 139 may function as an IP receiver.

4. Processors

As shown in FIG. 3, the processing subsystem 110 may include one or more processors, such as processor 138 configured to control the operations of the processing subsystem 110. The processing subsystem 110 may also include a signal processing unit 139 configured to process incoming media content. The signal processing unit 139 may be configured, for example, to demodulate and parse encoded digital media content. In some examples, the processing subsystem 110 may include one or more signal processing units 139 corresponding to each of the tuners 137.

In some examples, if the incoming media content is in the form of IP data packets (e.g., in IPTV configurations), the media content may be processed directly by the signal processing unit 139, the processor 138, and/or any other processor configured to process IP data packets.

The processing subsystem 110 may also include a graphics engine 140 configured to generate graphics that are to be displayed by the display 112. The graphics may include graphical user interfaces such as, but not limited to, one or more program guides, selectable program guide navigation tools, and other graphics.

5. Application Clients

Returning to FIG. 3, one or more applications 141-142 residing within the processing subsystem 110 may be executed upon initiation by a user of the processing subsystem 110. The applications 141-142, or application clients, may reside in memory 135 or in any other area of the processing subsystem 110 and be executed by the processor 138. The applications 141-142 shown in FIG. 3 are merely illustrative of the many different applications that may reside within the processing subsystem 110.

As shown in FOG. 3, one of the applications may include a personal video recording ("PVR") application 141. A PVR application is also referred to as a digital video recording ("DVR") application. As used herein and in the appended claims, unless otherwise specifically denoted, the term "PVR application" will be used to refer to any application or device configured to record media content and/or provide for the viewing of media content in trick play modes. Trick play modes include, but are not limited to, slow motion, fast motion, reverse play, fast forward play, instant replay, jumping, pausing of live broadcast, and scanning. The PVR application 141 may also provide for media content recording functionality by enabling the temporary and/or permanent recording of media content to the storage device 134.

In some examples, the PVR application 141 may be integrated into the processing subsystem 110, as shown in FIG. 3, or it may be a stand-alone unit. A stand-alone PVR may be coupled to the processing subsystem 110 or it may be used in place of the processing subsystem 110. In the examples contained herein, it will be assumed that the PVR application 141 is integrated into the processing subsystem 110 for illustrative purposes only.

The processing subsystem 110 may additionally or alternatively include a program guide application 142 configured to generate a linear program guide that may be provided for presentation on the display 112. The program guide may be generated from data stored within the processing subsystem 110 and/or data received from an external source such as the media content provider 111. Typically, the program guide includes data associated with content carriers (e.g., television channels) and corresponding media content instances (e.g., television programs) that are available via the respective content carriers.

The linear program guide may be represented as a linear list of navigable elements (e.g., blocks or rows), meaning that the user is able to navigate to the different elements. For example, the linear program guide may include a plurality of content carriers (i.e. a list of content carriers) and an endpoint located at an end of the list of content carriers. In certain embodiments, the program guide includes two endpoints, with an endpoint being located at either end of the linear list of content carriers.

FIG. 5 illustrates an exemplary linear program guide structure 150, according to an embodiment. As shown in FIG. 5, the program guide structure 150 may include a list of multiple media content carriers 152-1 through 152-N (collectively referred to as "media content carriers 152"). Each of the media content carriers 152 may be associated with one or more media content instances that can be processed by the processing subsystem 110 as described above.

The program guide structure 150 may also include two endpoints represented in the example of FIG. 5 as the beginning 151 and the end 153 of the program guide structure 150. Each of the endpoints of the program guide structure 150 may be positioned at one end of the linear list of content carriers 152. In other embodiments, the program guide structure 150 may include only a singe endpoint positioned at one end of the linear list of content carriers 152.

As shown in FIG. 5, in some examples an endpoint may be positioned adjacent to no more than one media content carrier 152. For example, the end 153 of the program guide structure 150 is positioned adjacent only to media content carrier 152-N. In particular, the endpoint 153 is not adjacent to the first media content carrier 152-1, at least because the program guide structure 150 is linear rather than circular.

In certain embodiments, the endpoints of the program guide structure 150 are not media content carriers. That is, the endpoints are not associated with and do not carry media content.

As described below, any endpoint included in the linear program guide structure 150 may be associated with and provide access to one or more tools for navigating within the program guide structure 150, as will be described further below. Because the program guide structure 150 of FIG. 5 is linear with navigable endpoints, it is not restricted by certain limitations associated with conventional circular program guides. For example, instead of being limited to automatically wrapping around from a last channel to a first channel when a user scrolls beyond the last channel, the linear program guide structure 150 enables the processing subsystem 110 to provide a user with one or more navigation tools, which the user may utilize to conveniently navigate within the program guide structure 150. Exemplary navigation tools will be described further below.

The program guide application 142 may be configured to instruct the processing subsystem 110 to provide a program guide, or at least a portion of a program guide to the display 112 for presentation to a user. For example, a program guide (or at least a portion thereof) coinciding with the program guide structure 150 of FIG. 5 may be included in a graphical user interface ("GUI") that is provided to the display 112 for presentation to the user. The GUI may be configured to support the performance of various functions including enabling a user to navigate, select, and/or view information and options associated with various media content carriers, media content instances, and navigation tools.

Figure 6:
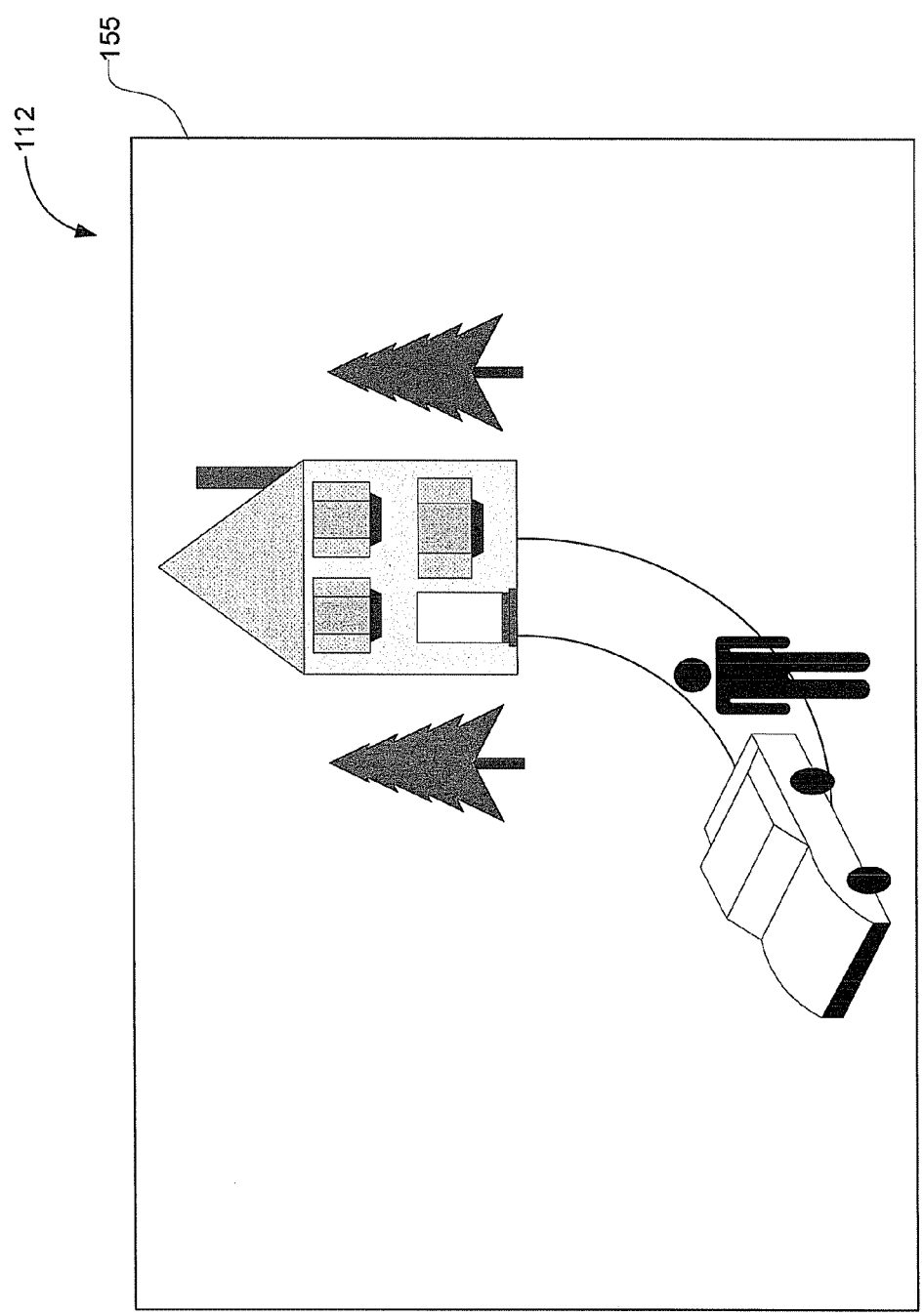
FIG. 6 illustrates a viewing screen of an exemplary display with a particular scene or frame of media content displayed thereon, according to an embodiment.

To facilitate an understanding of the program guide application 142, FIGS. 6-12 illustrate various embodiments of views caused to be displayed on the display 112 by the processing subsystem 110. FIG. 6 illustrates a viewing area or screen 155 of an exemplary display 112 with a particular scene or frame of a media content instance displayed thereon. In some examples, the user may be interested in viewing a program guide GUI in order to access a different media content instance (e.g., by changing channels) and/or view information related to one or more media content instances.

Figure 7:
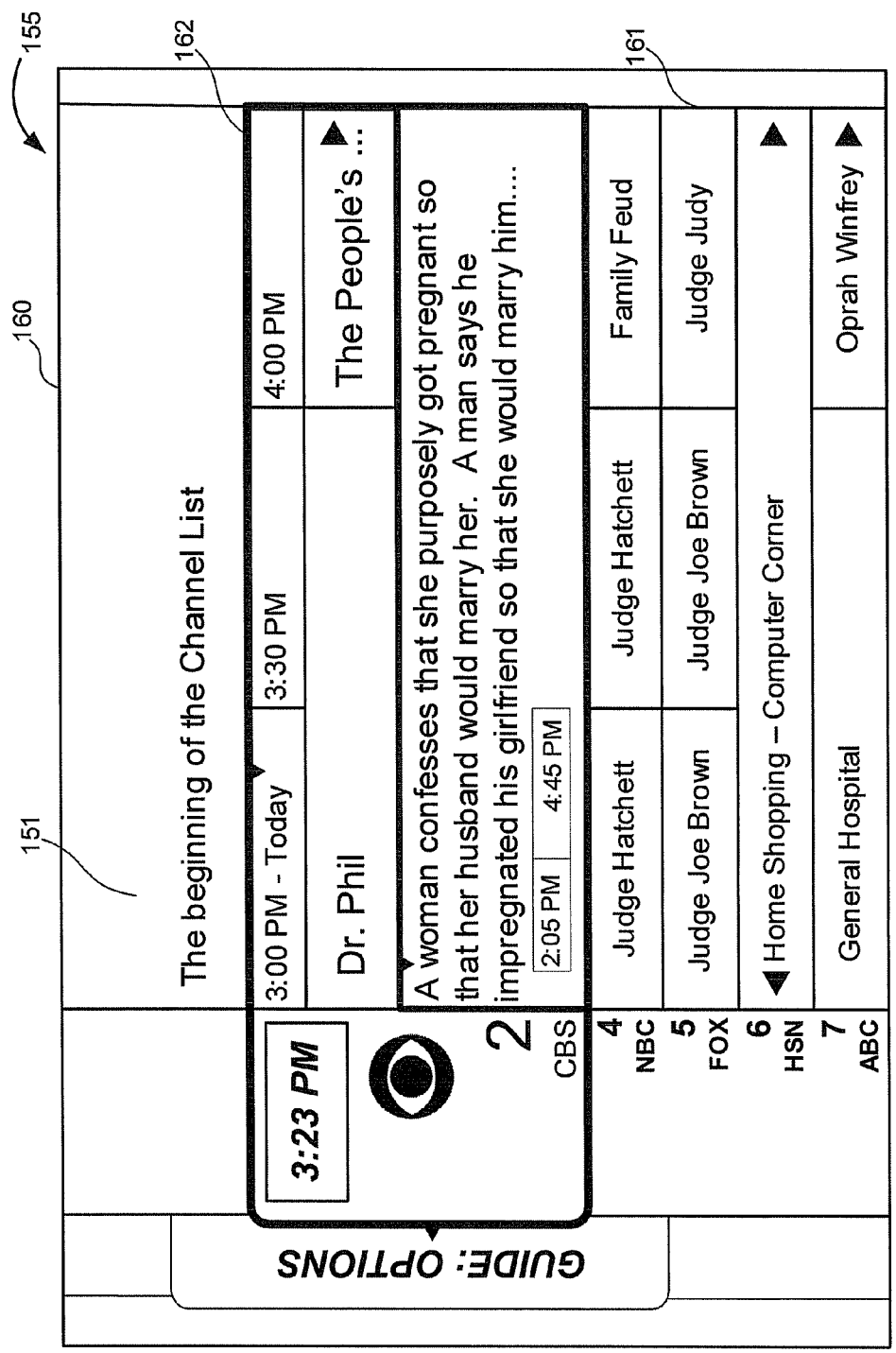
FIG. 7 illustrates the viewing screen of FIG. 6 with an exemplary full screen program guide graphical user interface displayed thereon, according to an embodiment.

FIG. 7 illustrates an exemplary program guide graphical user interface ("GUI") 160 that may be provided for presentation on the viewing screen 155 of the display 112. The program guide GUI 160 may be evoked using a number of different methods. For example, the user may press a dedicated button on a user input device (e.g., the program guide button 144 on the remote control user input device 113). Additionally or alternatively, the user may evoke the program guide GUI 160 by pressing any of the arrow keys 145-148 on the user input device 113.

As shown, the program guide GUI 160 of FIG. 7 may occupy substantially the entire viewing screen 155 of the display 112. However, the program guide GUI 160 may alternatively occupy only a portion of the viewing screen 155.

Figure 10:
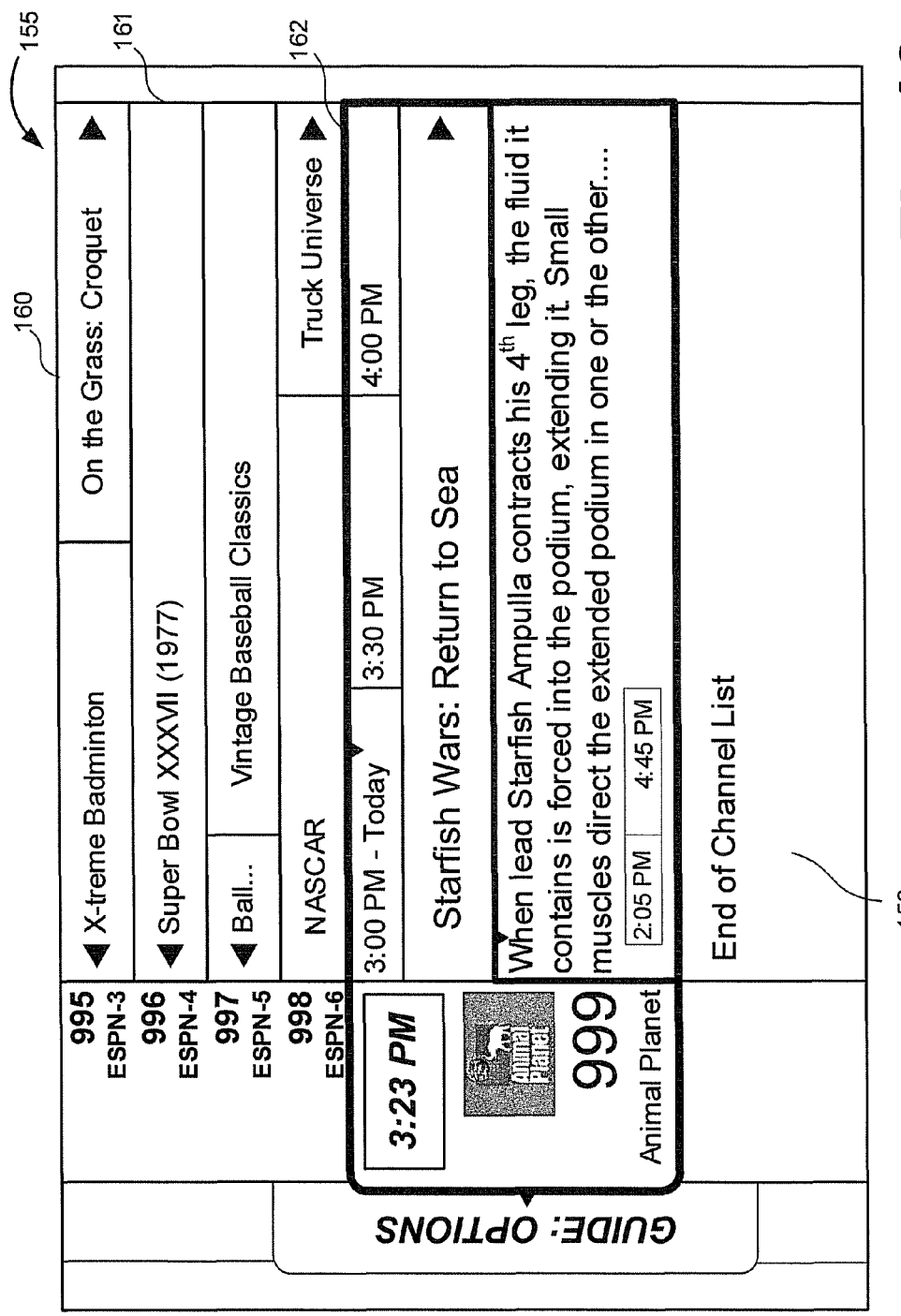
FIG. 10 illustrates the viewing screen of FIG. 6 with another exemplary full screen program guide graphical user interface displayed thereon, according to an embodiment.

As shown in FIG. 7, the program guide GUI 160 may include a linear program guide 161, which may include elements arranged in accordance with the linear program guide structure 150 of FIG. 5. As shown in FIG. 7, for example, the program guide 160 may include rows corresponding with respective content carriers such as media channels. In FIG. 7, the rows are positioned to form a linear list of content carriers. The program guide 161 may also include one or more endpoints. An endpoint may be positioned at an end of the list of channels included in the program guide 161. In FIG. 7, for example, the program guide 161 is shown to include an endpoint illustrated as the beginning 151 of the list of channels included in the program guide 161. FIG. 10, which is described further below, shows another endpoint illustrated as the end 153 of the list of channels included in the exemplary program guide 161.

The linear program guide 161 may be displayed in a grid-like style with a number of blocks of information corresponding to a number of media content instances being broadcast, streamed, or otherwise transmitted during a specified period of time. For example, the program guide 161 of FIG. 7 shows the titles of the media content instances being broadcast on a number of different channels during a 1.5 hour time period between 3:00 PM and 4:30 PM. The length of the time period shown in the program guide 161 may vary as may serve a particular application and may be specified by the user. Moreover, it will be recognized that the term "channel" will be used herein to refer broadly to any analog, digital, or other type of channel and that in turn "channel" is an example of a content carrier as discussed above.

It will be assumed that the media content instances are broadcast in the examples given herein for illustrative purposes only. However, the media content instances may additionally or alternatively be streamed or otherwise transmitted to the processing subsystem 110.

The program guide 161 of FIG. 7 shows the titles corresponding to media content instances being broadcast on five channels for illustrative purposes only. It will be recognized that the number of channels for which information is displayed in the program guide 161 may vary as may serve a particular application. Moreover, the type of information displayed for each media content instance may vary as may serve a particular application.

The elements (e.g., blocks and/or rows) included in the linear program guide 161 may be navigable by a user. In some examples, the user may use the left and right buttons 145 and 146 of the user input device 113 to scroll backwards and forwards in time to view information corresponding to media content instances broadcast at different times than those currently shown in the program guide 161 of FIG. 7. For example, with reference to the program guide 161 shown in FIG. 7, the user may scroll forward in time to view information corresponding to media content instances to be broadcast after 4:30 PM.

The user may also use the up and down buttons 147 and 148 of the user input device 113 to view information corresponding to channels not being currently displayed in the program guide 161. For example, with reference to the program guide 161 shown in FIG. 7, the user may scroll down one channel to view information corresponding to channel 2 through channel 8.

The program guide 161 may include a selection tool 162 configured to highlight an element to which a user has navigated. The program guide GUI 160 may enable the user to move the selection tool 162 to different locations within the GUI 160. For example, as the user actuates arrow buttons 145-148 of the user input device 113 to navigate within the program guide 161, the processing subsystem 110 may cause the selection tool 162 to move accordingly and to highlight selected portions (e.g., blocks or rows) of the program guide 161. Accordingly, the user is able to control movement of the selection tool 162 in order to select different elements of the program guide 161.

The user may move the selection tool 162 to an endpoint of the program guide 160 by scrolling the selection tool 162 beyond the first or last channel in the list of channels. In certain embodiments, the user may also enter a particular channel number using the buttons on the user input device 113 while the program guide 161 is displayed on the viewing screen 155. Accordingly, in some examples, the user may move the selection tool 162 to an endpoint of the program guide 162 by entering a channel number having a value that is less than the first channel number in the list or greater than the last channel number in the list. In the program guide 161 of FIG. 7, for example, if the user enters channel "1," the processing subsystem 110 may move the selection tool 162 to the beginning 151 of the channel list.

In some embodiments, the selection tool 162 includes enhanced information corresponding to a media content instance of a selected channel. For example, the selection tool 162 of FIG. 7 displays enhanced information corresponding to one or more media content instances that are broadcast on selected channel 2 (CBS). As used herein, the term "enhanced information" refers to any information that is in addition to the information displayed for channels not located within the selection tool 162, including, for example, a program summary, an image (e.g., a photograph, a logo, or an icon), a current time, a progress bar, a video feed, a time scale, and/or any other type of information corresponding to one or more of the media content instances broadcast on the selected channel located within the selection tool 162.

In some examples, as shown in FIG. 7, a row associated with a channel of the program guide 161 that is located within the selection tool 161 may be displayed as being larger than the other rows within the program guide 161. Additionally or alternatively, the selection tool 162 may be distinguished from the other blocks of information within the program guide 161 by having a different color, border, font, and/or other attribute than the other blocks of information within the program guide 161.

The enhanced information shown in FIG. 7 is illustrative and not restrictive in any sense. In other embodiments, different information may be presented in connection with a channel being located within the selection tool 162. In some embodiments, the selection tool 162 may be configured to simply indicate which channel is currently selected, without presenting enhanced information.

As mentioned earlier, selection tool 162 may be configured to enable a user to navigate within the program guide 161, including scrolling through the list of navigable content carriers (e.g., channels) shown in FIG. 7. As shown in FIG. 7, for example, the row corresponding with channel 2 is highlighted by the selection tool 162.

Figure 8:
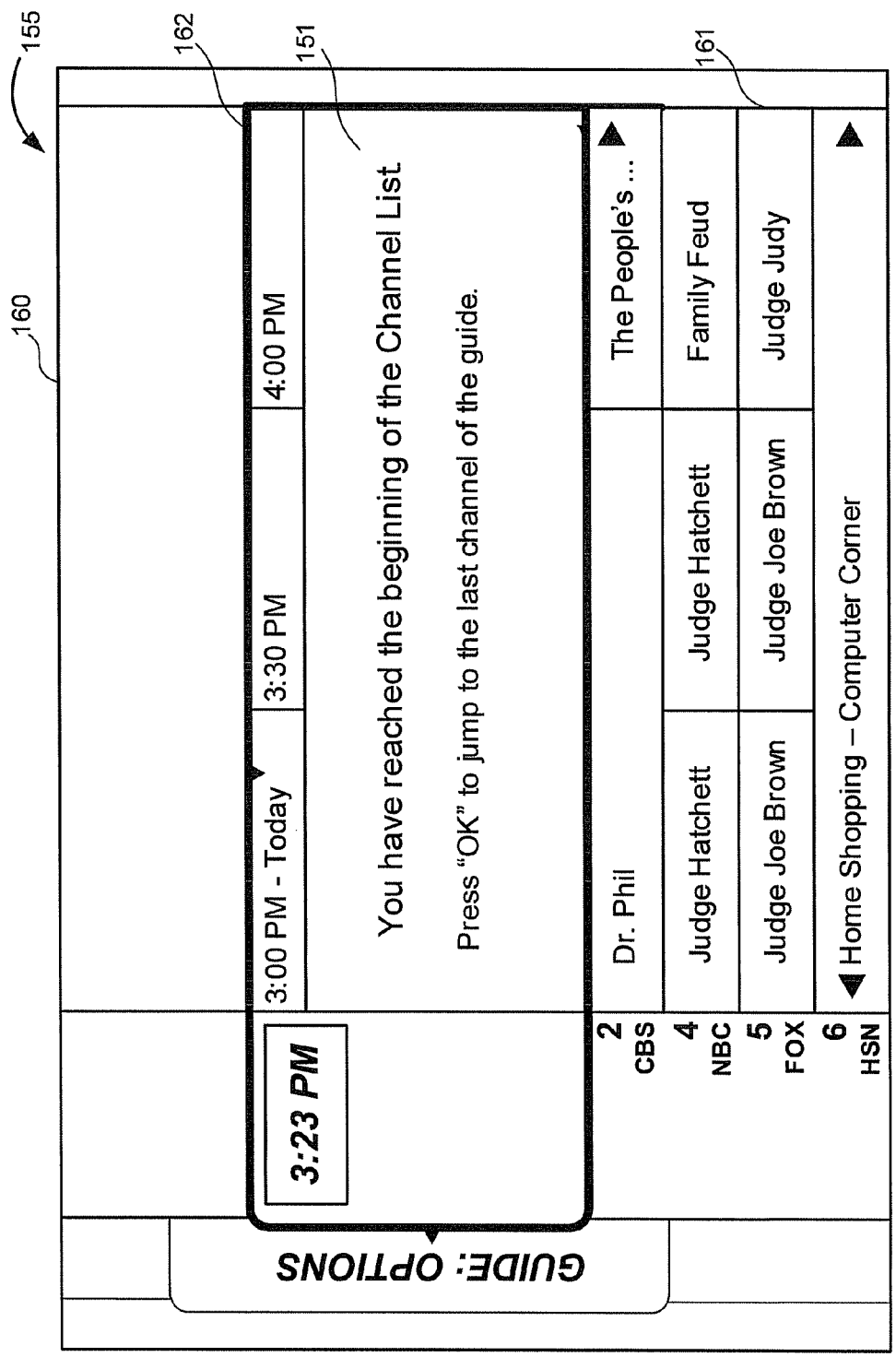
FIG. 8 illustrates an exemplary view of the program guide graphical user interface of FIG. 7 in which a selection tool has been navigated to a beginning of an exemplary program guide, according to an embodiment.

In certain embodiments, any endpoints included in the program guide 161 are also navigable. Thus, similar to navigations between different content carriers (e.g., channels) as described above, a user may also be provided with capabilities for navigating to an endpoint of the program guide 161. When a user scrolls beyond the first or last channel in the program guide 161, for example, an endpoint such as the beginning 151 or the end 153 of the program guide 161 may be selected and highlighted within the selection tool 161. For example, FIG. 8 illustrates the program guide GUI 160 of FIG. 7 as may be presented when the selection tool 161 has been moved from channel 2 to the beginning 151 of the channel list. In response to such a navigation event (i.e., user navigation to an endpoint of the program guide 161), the processing subsystem 110 may provide at least one navigation tool, information, and/or other functionality to the user. This feature is enabled at least in part by the endpoint 151 being a navigable element of the program guide 161.

In FIG. 8, a selectable navigation tool and message have been provided in response to a user navigating to endpoint 151 of the program guide 161. In this example, the message is designed to inform the user that the beginning of the channel list has been reached. Of course, other messages may be provided. The navigation tool shown in FIG. 8 includes a selectable shortcut (e.g., an "OK" button or other suitable input mechanism) to a predefined location within the program guide 161 (e.g., the last channel in the program guide 161). The navigation tool may be pre-associated with the predefined location. Accordingly, when the user selects the navigation tool, the processing subsystem 110 may be configured to respond by navigating to the predefined location. This can be accomplished in any suitable manner, including moving the selection tool 162 to the predefined location as illustrated in FIG. 10, which shows the selection tool 162 located at the last channel in the program guide 161. As used herein, "moving the selection tool 162 to the predefined location" may include any suitable manner of associating the selection tool 162 with the predefined location in the program guide 161, including the program guide 161 being moved, re-rendered, or otherwise adjusted such that the predefined location is identified by (e.g., located within) the selection tool 162.

Figure 9:
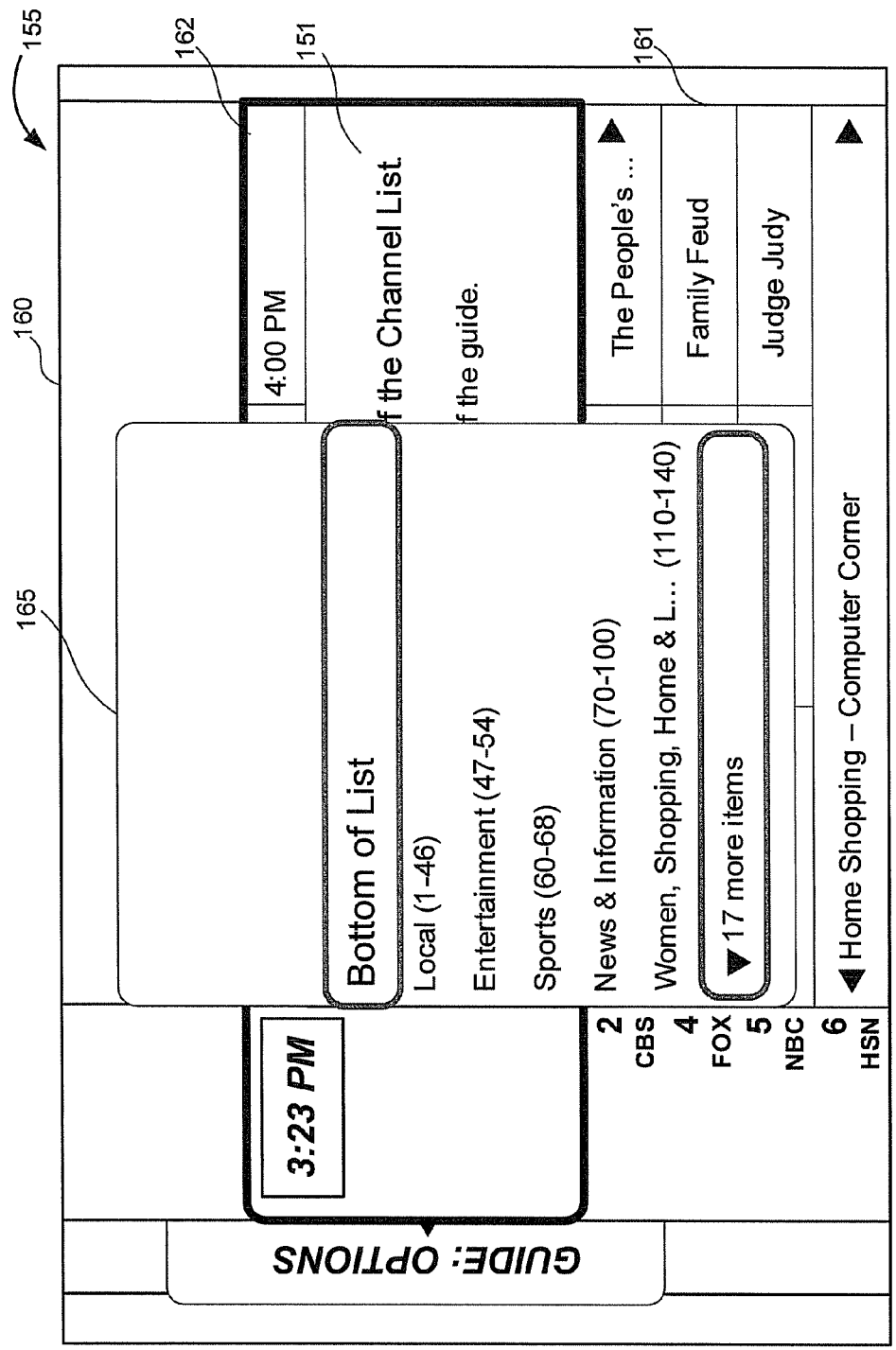
FIG. 9 illustrates another exemplary view of the program guide graphical user interface of FIG. 7 in which an exemplary navigation palette is displayed, according to an embodiment.

Additionally or alternatively, one or more other navigation tools may be provided in response to the user navigating to an endpoint of the program guide 161. FIG. 9 illustrates a navigation palette 165 that may be presented in the program guide GUI 160. The navigation palette 165 may be presented in the viewing screen 155 as an overlay to at least a portion of the program guide 161. The processing subsystem 110 may be configured to evoke the navigation palette 165 in response to a user providing a predefined command, including a command (e.g., an "OK" button or other suitable input mechanism) that is enabled during presentation of the viewing screen of FIG. 8. Alternatively, the processing subsystem 110 may be configured to evoke the navigation palette 165 in response to a user navigating to an endpoint of the program guide 161 as described above. Accordingly, in certain embodiments, the program guide GUI 160 displayed as shown in FIG. 7 may be changed directly or indirectly to the program guide GUI 160 displayed as shown in FIG. 9, in response to a user navigating to an endpoint of the program guide 161.

The contents of the navigation palette 165 may be generated dynamically based on the services and/or media content that is available to a user associated with the media content processing subsystem 110. This determination may be based on the services and/or media content to which the user subscribes.

The navigation palette 165 may include at least one selectable navigation tool for navigating within the program guide 161. The navigation tools included in the palette 165 may include one or more shortcuts to other locations within the program guide 161. As shown in FIG. 9, for example, the navigation palette 165 may include a selectable shortcut to the bottom of the channel list of the program guide 161 (e.g., to the last channel in the list).

Additionally or alternatively, the navigation palette 165 may include selectable shortcuts to different groups of channels, or to one or more channels within the different groups. Channels included in the program list may be pre-assigned to one or more categories such that each category may include a group of one or more channels. Any suitable criteria may be used to categorize channels into groups, including, but not limited to, channel identifiers and/or attributes of media content instance broadcast on the channels. Examples of such attributes may include, but are not limited to, genre, theme, production date, actor name, rating, producer name, production entity, language, or any other attributes of the media content instances. In the embodiment of FIG. 9, for example, channels have been divided into groups based on several exemplary categories, which include local channels, entertainment channels, sports channels, news and information channels, and channels related to women, shopping, home, and leisure. The exemplary categories are used for illustrative purposes only and are not limiting; other categories may be used in other embodiments.

The category-based groups of channels shown in FIG. 9 may be defined dynamically or in advance. In certain embodiments, for example, the list of channels may be organized and channels assigned to categories in advance. In other embodiments, the list of channels may be filtered and/or sorted to dynamically define the groups of channels. Dynamic generation of the channel groups may be configured to account for changes to media content, scheduling changes, and diversity in media content presented by a content carrier. By way of an example, when the navigation palette 165 is evoked, the processing subsystem 110 may dynamically generate the "Sports" channel grouping by identifying each channel broadcasting "Sports" content at a particular time and adding such channels to the group. The list of channels may be searched, filtered, or sorted using any suitable technologies.

As shown in FIG. 9, the navigation palette 165 may enable the user to scroll or otherwise navigate through multiple selectable navigation tools. In addition to the exemplary category shortcuts shown in FIG. 9, for example, the embodiment of FIG. 9 includes seventeen other items or selectable navigation tools that are hidden from view but to which the user may navigate.

A user is able to conveniently utilize the above-described navigation tools to instruct the processing subsystem 110 to navigate to predefined locations within the program guide 161, including locations associated with groups of channels that broadcast common categories of media content. For example, the user may select the "Sports" navigation tool shown in FIG. 9 to cause the program guide GUI 160 to display a group of channels, or at least a subset of the group of channels, that broadcast media content related to sports. With reference to the example shown in FIG. 9, the selection tool 162 of the program guide GUI 160 may be moved to channel 60 upon a user selection the "Sports" navigation tool.

In certain embodiments, at least one navigation tool is pre-associated with each endpoint of the linear program guide 161 such that when the selection tool 162 is moved to an endpoint, one or more navigation tools are made available to the user for use in conveniently navigating within the program guide, including causing the selection tool 162 to jump from an endpoint to another element within the program guide 161. Thus, the navigation tools provide the user with convenient, intuitive, and selectable functionality for navigating within the program guide 161, as described above.

Figure 11:
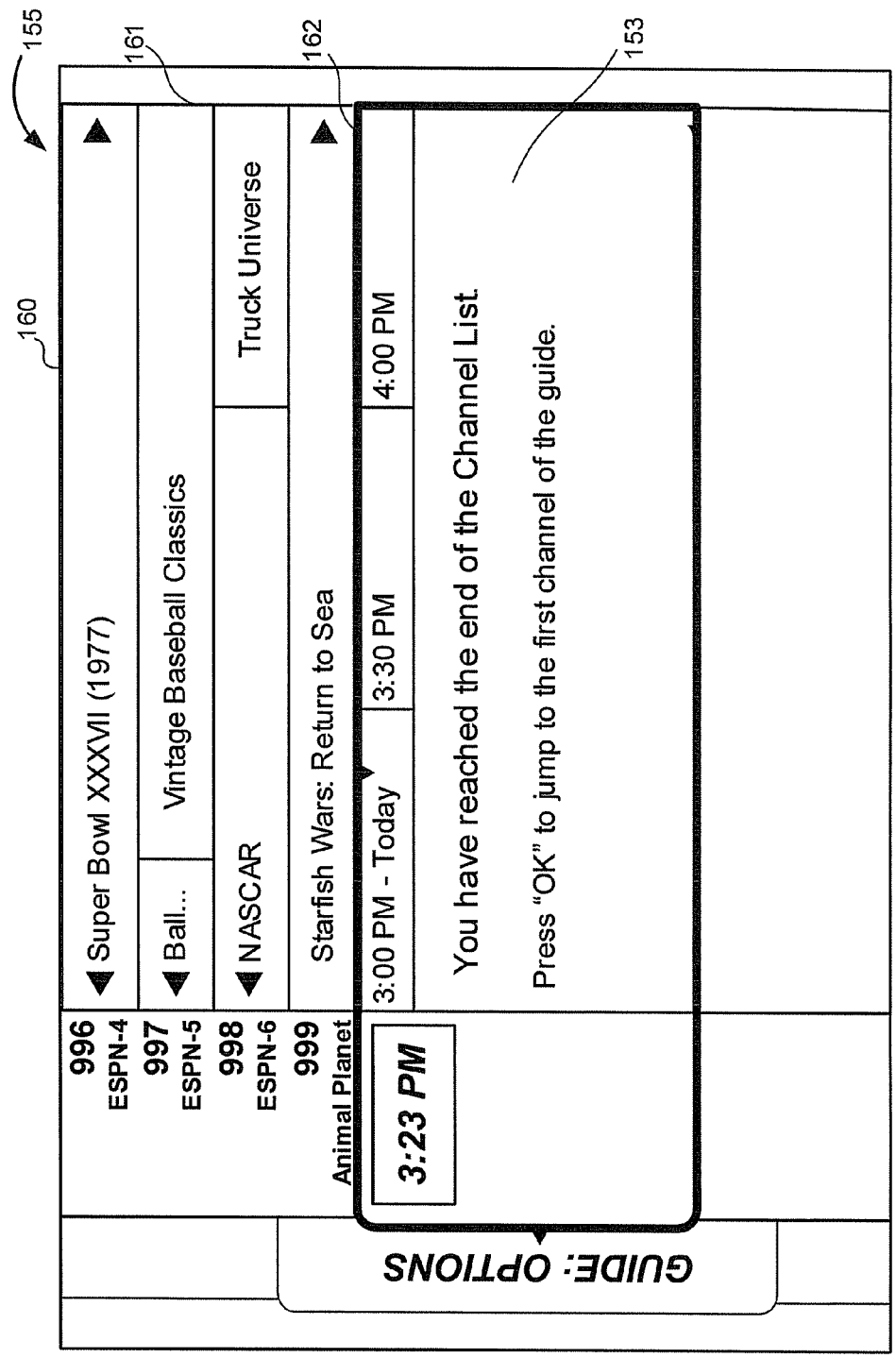
FIG. 11 illustrates an exemplary view of the program guide graphical user interface of FIG. 10 in which a selection tool has been navigated to an end of an exemplary program guide, according to an embodiment.
Figure 12:
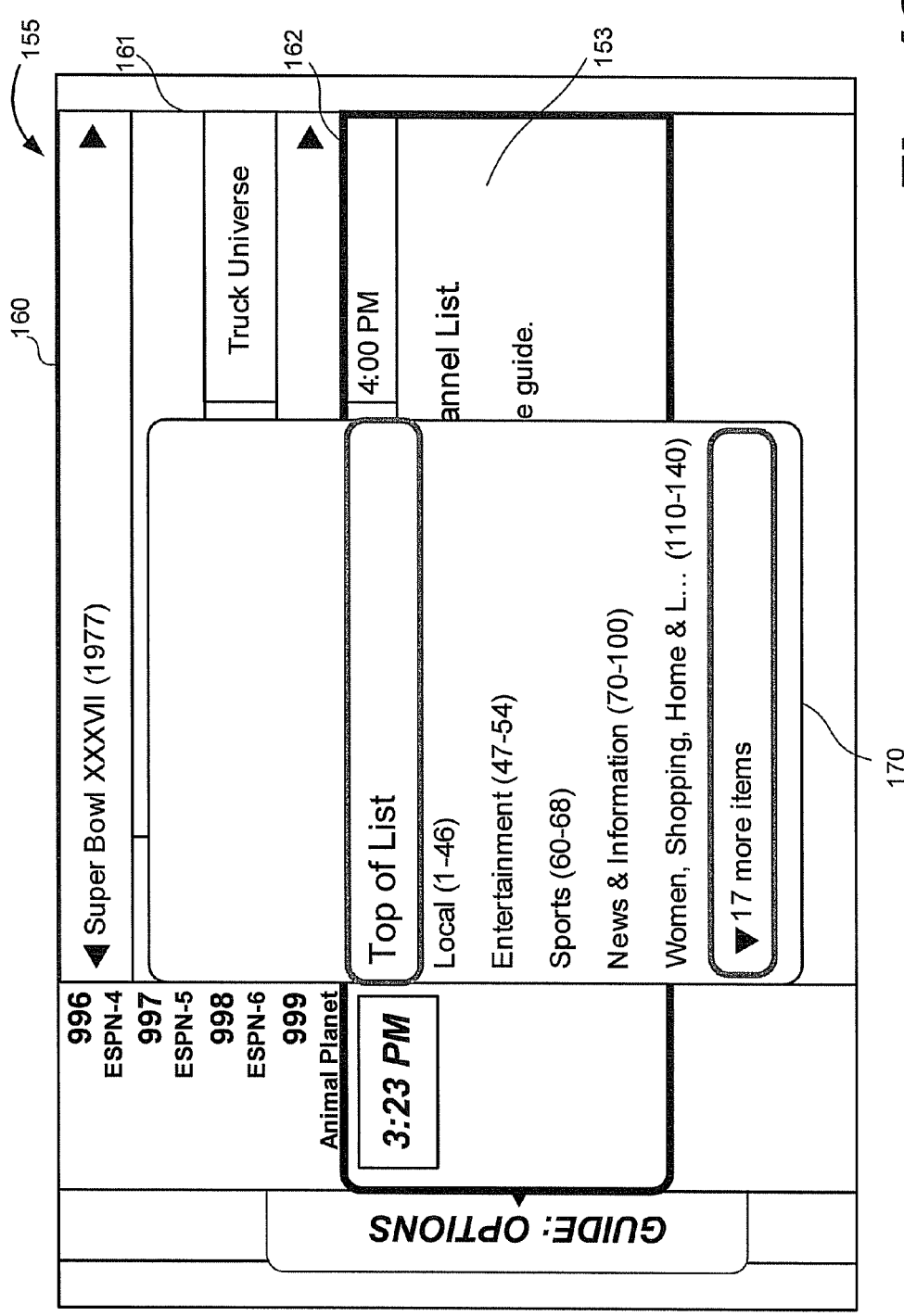
FIG. 12 illustrates another exemplary view of the program guide graphical user interface of FIG. 10 in which another exemplary navigation palette is displayed, according to an embodiment.

While FIGS. 7-9 illustrate the processing subsystem 110 providing one or more navigation tools when the selection tool 162 is moved to the beginning 151 of the exemplary program guide 161, in similar fashion, one or more navigation tools may be provided when the selection tool 162 is moved to the end 153 of the program guide 162. FIGS. 10-12 illustrate various embodiments of views related to the end 153 of the program guide 162. In FIG. 10, the last channel (channel 999 in this example) is currently within the selection tool 162. From this view, the user may utilize the user input device 113 to move the selection tool 162 to the end 153 of the channel list of the program guide 161. The end 153 of the channel list may then be positioned within the selection tool 162 as shown in FIG. 11.

When the end 153 of the channel list is positioned within the selection tool 162, the processing subsystem 110 may provide at least one navigation tool to the user. In FIG. 10, a selectable shortcut to the first channel (e.g., channel 2) of the channel list is provided. The user may select the selectable shortcut by pressing a designated button (e.g., "OK" or "SEL") on the user input device 113, or by providing another designated form of input, to cause the selection tool 162 to move to the first channel (or other predefined location) within the program guide 161.

Additionally or alternatively, other navigation tools may be provided when the user navigates to the end 153 of the program guide 161. FIG. 11 illustrates a navigation palette 170 having a plurality of selectable navigation tools, including shortcuts to various predefined locations within the program guide 161. In the example shown in FIG. 11, navigation palette 170 is the same as navigation palette 165 except that the navigation palette 170 of FIG. 11 includes a shortcut to the top of the channel list (e.g., to the first channel of the channel list) rather than a shortcut to the bottom of the list.

By providing the user with a linear program guide 161 having one or more navigable endpoints, the processing subsystem 110 is able to detect a user navigating to an endpoint of the program guide 161 and to provide at least one selectable navigation tool in response to the user navigating to the endpoint. In this manner, the user is afforded enhanced controls for navigating within the program guide 161. The enhanced controls provide significant flexibility, control, and convenience as compared with the limitations associated with conventional circular program guides. For example, the selectable navigation tools can generally help ensure that a user is aware that she has navigated beyond the first or last channel in the channel list of the program guide. Moreover, the user can easily and conveniently select a selectable navigation tool to cause the selection tool 162 to be moved to a desired location within the program guide 161, including a location (e.g., a channel or a group of channels) associated with a category of media content. In some embodiments, the user is able to choose from a group of multiple program guide locations associated with different selectable shortcuts.

III. Exemplary Process View

FIG. 13 illustrates an exemplary method of providing a linear program guide and tools for navigating within the linear program guide, according to an embodiment. While FIG. 13 illustrates exemplary steps according to one embodiment, other embodiments may omit, add to, reorder, and/or modify any of the steps shown in FIG. 13.

In step 230, a linear program guide is provided for presentation to a user. Step 230 may be performed in any of the ways described above. For example, program guide 161 may be generated using any suitable application within the processing subsystem 110 as described previously. The generated program guide 161 may be provided to the display 112 for presentation to the user. As described above, the program guide 161 may include a list of navigable content carriers (e.g., channels) and associated media content instances carried by the content carriers, as well as a navigable endpoint at the beginning and/or the end of the list.

The user may navigate within the program guide 161 in any of the ways described above. For example, the user may utilize the user input device 113 to move the selection tool 162 within the program guide 161 to highlight different elements (e.g., rows or blocks of information) of the program guide 160.

In step 235, a user navigation to an endpoint of the program guide is detected. Step 235 may be performed in any of the ways described above, including the receiver 132 receiving user input commands transmitted by the user input device 113, and the program guide application 142 using the user input commands to identify a navigation event configured to cause the selection tool 162 to be moved to an endpoint of the program guide 161. The program guide application 142 may instruct the processing subsystem 110 to move the selection tool 162 to the endpoint.

In step 240, at least one selectable navigation tool is provided for presentation to the user in response to the detection of step 235. Step 240 may be performed in any of the ways described above, including the processing subsystem 110 providing at least one selectable shortcut to a predefined location within the program guide 161. In some embodiments, step 240 includes the processing subsystem 110 providing a plurality of selectable shortcuts to various predefined locations within the program guide 161.

In step 245, a user selection of a selectable navigation tool is detected. Step 245 may be performed in any of the ways described above, including the receiver 132 of the processing subsystem 110 receiving user input commands transmitted by the user input device 113, and the program guide application 142 using the user input commands to identify a user selection of the navigation tool.

In step 250, navigation to a predefined location within the program guide is performed, where the predefined location has been pre-associated with the selected navigation tool. Step 250 may be performed in any of the ways described above, including updating the program guide GUI 160 and moving the selection tool 162 to the predefined location within the program guide 161. Step 250 may be performed automatically in response to detection of the user selecting the selectable navigation tool in step 245.

IV. Alternative Embodiments

The preceding description has been presented only to illustrate and describe exemplary embodiments with reference to the accompanying drawings. It will, however, be evident that various modifications and changes may be made thereto, and additional embodiments may be implemented, without departing from the scope of the invention as set forth in the claims that follow. For example, the navigable endpoints and associated shortcuts palettes may be implemented at the ends of electronic linear lists other than the exemplary linear program guides described herein. The above description and accompanying drawings are accordingly to be regarded in an illustrative rather than a restrictive sense.

What is claimed is:

1. A system comprising:
a media content processing subsystem configured to provide at least a portion of a linear program guide to a display, said linear program guide including
a list of media content carriers and associated media content instances, and
an endpoint located at one end of said list;
wherein said media content carriers and said endpoint are navigable, and
wherein said media content processing subsystem is further configured to detect a user navigating to said endpoint,
provide at least one previously unavailable selectable navigation tool in response to said user navigating to said endpoint,
dynamically generate a channel group by adding at least one media content carrier to the channel group based on a category of a media content instance broadcast by the media content carrier at a particular time, and
present a selectable shortcut to the dynamically generated channel group to the user via the navigation tool.

2. The system of claim 1, wherein said at least one selectable navigation tool includes a selectable shortcut to a predefined location within said linear program guide.

3. The system of claim 2, wherein said predefined location within said program guide includes one of said media content carriers, said one of said media content carriers having been pre-associated with said selectable shortcut.

4. The system of claim 3, wherein said one of said media content carriers is located at least proximate to another end of said list of media content carriers.

5. The system of claim 2, wherein said predefined location within said program guide includes a subset group of multiple said media content carriers, said subset group of multiple said media content carriers having been pre-associated with said selectable shortcut.

6. The system of claim 5, wherein said subset group of multiple said media content carriers is associated with a category of media content.

7. The system of claim 1, wherein said at least one selectable navigation tool includes a plurality of selectable shortcuts to a plurality of corresponding predefined locations within said linear program guide.

8. The system of claim 7, wherein each of said selectable shortcuts is associated with a different subset group of said media content carriers.

9. The system of claim 8, wherein each said different subset group of said media content carriers is associated with a different category of media content.

10. The system of claim 1, wherein said at least one selectable navigation tool is included in a navigation palette, said media content processing subsystem configured to provide said navigation palette to the display for presentation as an overlay to said at least a portion of said linear program guide.

11. The system of claim 1, wherein said media content processing subsystem is configured to
detect a user selection of said selectable navigation tool, and
cause, in response to said detection of said user selection, a selection tool to move to a predefined location within said program guide, said predefined location having been pre-associated with said selectable navigation tool.

12. The system of claim 1, wherein said linear program guide further includes another endpoint located at another end of said list, said another endpoint being navigable by the user and associated with at least one other selectable navigation tool for navigating within said linear program guide.

13. The system of claim 1, wherein said endpoint is not adjacent to the media content carrier at the other end of said list of said media content carriers.

14. An apparatus comprising:
a graphics engine configured to generate one or more graphics to be provided to a display for presentation to a user; and
at least one processor communicatively coupled to said graphics engine, said processor configured to cause said graphics engine to generate a program guide graphical user interface to be provided to the display, said program guide graphical user interface including at least a portion of a linear program guide, said linear program guide including a list of navigable media content carriers and associated media content instances, a first navigable endpoint located at one end of said list, and a second navigable endpoint located at another end of said list;

wherein when the user navigates to said first navigable endpoint, said at least one processor is configured to cause at least one previously unavailable selectable navigation tool to be provided to the display for presentation to the user; and wherein when the user navigates to said second navigable endpoint, said at least one processor is configured to cause at least one other previously unavailable selectable navigation tool to be provided to the display for presentation to the user, wherein at least one of said predefined locations includes a subset group of said media content carriers, wherein said subset group is dynamically generated by adding at least one media content carrier to said subset group based on a category of a media content instance broadcast by the media content carrier at a particular time.

15. The apparatus of claim 14, wherein said at least one selectable navigation tool includes a selectable shortcut to a first predefined location within said linear program guide, and said at least one other selectable navigation tool includes a selectable shortcut to a second predefined location within said linear program guide.

16. The apparatus of claim 15, wherein said first predefined location includes one of said media content carriers located adjacent to said second navigable endpoint, and said second predefined location includes a different one of said media content carriers located adjacent to said first navigable endpoint.

17. The apparatus of claim 14, wherein said at least one selectable navigation tool includes a plurality of selectable shortcuts to a plurality of predefined locations within said linear program guide.

18. The apparatus of claim 14, wherein each said subset group of said media content instance is associated with a different category of media content.

19. The apparatus of claim 14, wherein said at least one processor is configured to detect a user selection of said selectable navigation tool, and navigate, in response to said detection of said user selection, to a predefined location within said linear program guide, said predefined location having been pre-associated with said selectable navigation tool.

20. A method comprising:

providing at least a portion of a linear program guide to a display device for presentation to a user, said linear program guide including a list of navigable media content carriers and associated media content instances, and a navigable endpoint located at one end of said list;

detecting a user navigation to said endpoint;

providing, in response to said user navigation to said endpoint, at least one previously unavailable selectable navigation tool to the display device for presentation to the user;

dynamically generating a channel group by adding at least one media content carrier to the channel group based on a category of a media content instance broadcast by the media content carrier at a particular time; and presenting a selectable shortcut to the dynamically generated channel group to the user via the navigation tool.

21. The method of claim 20, further comprising:

detecting a user selection of said selectable navigation tool; and navigating, in response to said detection of said user selection, to a predefined location within said program guide, said predefined location having been pre-associated with said selectable navigation tool.

22. The method of claim 20, wherein said navigating step includes automatically moving a selection tool to said predefined location.

23. The method of claim 20, wherein said predefined location includes a particular one of said content carriers located at least proximate to the other end of said list of content carriers.

* * * * *